US007418240B2

(12) United States Patent
Hsu et al.

(10) Patent No.: US 7,418,240 B2
(45) Date of Patent: Aug. 26, 2008

(54) DYNAMIC ADAPTATION OF IMPAIRED RF COMMUNICATION CHANNELS IN A COMMUNICATION SYSTEM

(75) Inventors: Hanna S Hsu, Irvine, CA (US); Daniel H Howard, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 642 days.

(21) Appl. No.: 10/245,594

(22) Filed: Sep. 18, 2002

(65) Prior Publication Data

US 2004/0203392 A1 Oct. 14, 2004

Related U.S. Application Data

(60) Provisional application No. 60/377,242, filed on May 3, 2002.

(51) Int. Cl.
*H04B 17/00* (2006.01)
(52) U.S. Cl. .................... 455/67.13; 455/102; 455/63.1; 455/67.11; 455/67.7; 455/226.1; 455/226.3; 455/68; 455/69; 455/423; 370/252; 370/465
(58) Field of Classification Search .............. 455/67.11, 455/12, 67.13, 16, 63.1, 67.7, 115.1–115.4, 455/226.1–226.4, 552.1, 68–69, 67.12, 67.16, 455/101–103, 114, 1–2, 296, 522, 423–425; 370/252–253, 464–468; 375/222, 225, 377; 725/95, 111, 118, 107, 121–125
See application file for complete search history.

(56) References Cited

U.S. PATENT DOCUMENTS

| 3,700,876 | A | | 10/1972 | Gray | |
|---|---|---|---|---|---|
| 5,394,185 | A | | 2/1995 | Bernard | |
| 5,394,392 | A | * | 2/1995 | Scott | ........................ 370/295 |
| 5,450,438 | A | * | 9/1995 | Landry et al. | ............... 375/222 |
| 5,499,189 | A | | 3/1996 | Seitz | |
| 5,603,088 | A | * | 2/1997 | Gorday et al. | ........... 455/67.13 |

(Continued)

FOREIGN PATENT DOCUMENTS

EP    1 014 722 A2    6/2000

(Continued)

OTHER PUBLICATIONS

Optimizing Transmission Parameters in DOCSIS 2.0 With a Digital Upstream Channel Analyzer (DUCA) by Itay Lusky and Noam Geri from Texas Instrument, Broadband Communication Group.*

(Continued)

*Primary Examiner*—Tuan A Tran
(74) *Attorney, Agent, or Firm*—Stern, Kessler, Goldstein & Fox PLLC

(57) ABSTRACT

A system for dynamically adapting a communication channel to channel impairments includes a spectrum monitor configured to determine a channel impairment characteristic related to a channel impairment present in the channel. The system includes a system manager configured to determine a quality metric indicative of channel performance for the channel, and adjust one or more operating parameters in a set of channel operating parameters when the quality metric is not within a target range, whereby the communication channel operates in accordance with the adjusted parameters.

27 Claims, 21 Drawing Sheets

U.S. PATENT DOCUMENTS

| | | | | |
|---|---|---|---|---|
| 6,167,031 | A | * | 12/2000 | Olofsson et al. ............. 370/252 |
| 6,262,994 | B1 | * | 7/2001 | Dirschedl et al. ........... 370/465 |
| 6,359,934 | B1 | * | 3/2002 | Yoshida ...................... 375/262 |
| 6,385,773 | B1 | | 5/2002 | Schwartzman et al. |
| 6,442,495 | B1 | * | 8/2002 | Fleming-Dahl .............. 702/69 |
| 6,452,964 | B1 | * | 9/2002 | Yoshida ...................... 375/222 |
| 6,650,872 | B1 | * | 11/2003 | Karlsson .................. 455/67.11 |
| 6,658,235 | B1 | * | 12/2003 | Tolmunen et al. ........ 455/67.13 |
| 2003/0182664 | A1 | * | 9/2003 | Lusky et al. ................ 725/111 |
| 2003/0188254 | A1 | * | 10/2003 | Lusky et al. ................ 714/784 |
| 2005/0008097 | A1 | * | 1/2005 | Tjhung et al. ............... 375/302 |

FOREIGN PATENT DOCUMENTS

WO        WO 99/12304        3/1999

OTHER PUBLICATIONS

Eldering, C. et al., "CATV Return Path Characterization for Reliable Communications," *IEEE Communications Magazine*, IEEE, Aug. 1995, No. 8, pp. 62-69.

International Search Report for Appln. No. PCT/US01/43103, issued Sep. 26, 2002, 7 pages.

Pursley, M.B., et al., "Adaptive Signaling For Multimedia Transmissions In CDMA Cellular Radio Systems", Proceedings of Military Communications Conference, 1998, MILCOM 98, New York, NY, Oct. 18-21, 1998, vol. 1, pp. 113-117, IEEE, New York, NY.

Rohling, H., et al., "Adaptive Coding And Modulation In An OFDM-TDMA Communication System", VTC'98, 48$^{th}$ IEEE Vehicular Technology Conference, Ottawa, Canada, May 18-21, 1998, vol. 2, Conf. 48, pp. 773-776, IEEE, New York, NY.

Daji Qiao et al., Goodput Enhancement Of IEEE 802.11a Wireless LAN Via Link Adaptation:, ICC 2001, 2001 IEEE International Conference on Communications, Helsinky, Finland, Jun. 11-14, 2001, vol. 1, pp. 1995-2000, IEEE, New York, NY.

Vucetic, B.,, "an Adaptive Coding Scheme For Time-Varying Channels", IEEE Transactions On Communications, IEEE Service Center, Piscataway, NJ, May 1, 1991, vol. 39, No. 5, pp. 653-663.

European Search Report for Appl. No. 03010129.9, issued May 3, 2006, 5 pages.

* cited by examiner

SIMPLIFIED MODEL OF DOWNSTREAM FREQUENCY SPECTRUM ON CABLE PLANT

COARSE CPD FREQUENCIES FOR AN HRC PLANT

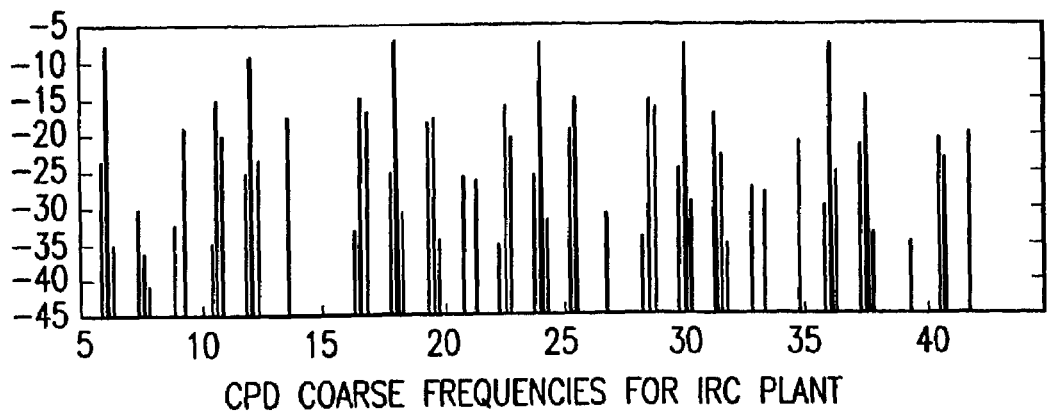
FIG.6 CPD COARSE FREQUENCIES FOR IRC PLANT
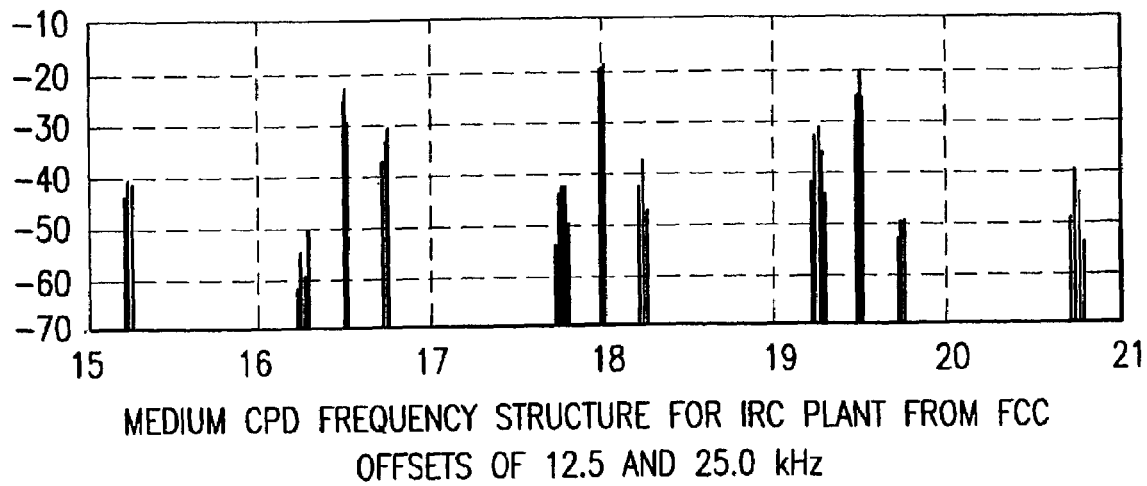
FIG.7 MEDIUM CPD FREQUENCY STRUCTURE FOR IRC PLANT FROM FCC OFFSETS OF 12.5 AND 25.0 kHz
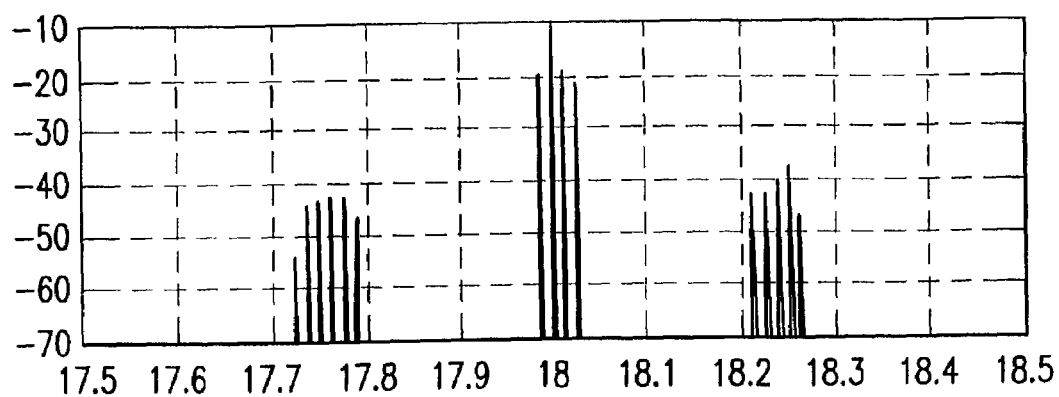
FIG.8 MEDIUM CPD FREQUENCY STRUCTURE IN DETAIL ABOUT 18 MHz FOR IRC PLANT

| Table 2 Required SNR for Varying FEC in 16 QAM Modulation ||||||||||
|---|---|---|---|---|---|---|---|---|---|
| 1518 Byte payload, PER<1%, Preamble Length = 36 symbols, Mini-slot length = 32 symbols ||||||||||
| RS_K bytes | RS_T bytes | Spec Eff (bps/Hz) | # MS | CNR (dB) | RS_K bytes | RS_T bytes | Spec Eff (bps/Hz) | # MS | CNR (dB) |
| 219 | 1 | 3.12 | 98 | 19.4 | 77 | 16 | 2.21 | 138 | 14.7 |
| 219 | 2 | 3.09 | 99 | 18.7 | 73 | 16 | 2.18 | 140 | 14.7 |
| 219 | 3 | 3.06 | 100 | 18.1 | 70 | 16 | 2.15 | 142 | 14.6 |
| 219 | 4 | 3.03 | 101 | 17.8 | 67 | 16 | 2.12 | 144 | 14.6 |
| 219 | 5 | 3 | 102 | 17.4 | 64 | 16 | 2.09 | 146 | 14.6 |
| 219 | 7 | 2.97 | 103 | 17 | 62 | 16 | 2.06 | 148 | 14.5 |
| 219 | 8 | 2.94 | 104 | 16.8 | 59 | 16 | 2.04 | 150 | 14.5 |
| 219 | 9 | 2.91 | 105 | 16.6 | 57 | 16 | 2.01 | 152 | 14.5 |
| 219 | 10 | 2.88 | 106 | 16.5 | 55 | 16 | 1.98 | 154 | 14.4 |
| 219 | 11 | 2.86 | 107 | 16.3 | 53 | 16 | 1.96 | 156 | 14.4 |
| 219 | 12 | 2.83 | 108 | 16.2 | 51 | 16 | 1.93 | 158 | 14.3 |
| 219 | 13 | 2.8 | 109 | 16.1 | 50 | 16 | 1.91 | 160 | 14.3 |
| 219 | 15 | 2.78 | 110 | 15.9 | 48 | 16 | 1.89 | 162 | 14.3 |
| 219 | 16 | 2.75 | 111 | 15.8 | 47 | 16 | 1.86 | 164 | 14.3 |
| 191 | 15 | 2.73 | 112 | 15.7 | 45 | 16 | 1.84 | 166 | 14.2 |
| 191 | 16 | 2.7 | 113 | 15.6 | 44 | 16 | 1.82 | 168 | 14.2 |
| 170 | 15 | 2.68 | 114 | 15.6 | 43 | 16 | 1.8 | 170 | 14.2 |
| 170 | 16 | 2.66 | 115 | 15.5 | 42 | 16 | 1.78 | 172 | 14.2 |
| 153 | 16 | 2.61 | 117 | 15.4 | 41 | 16 | 1.76 | 174 | 14.2 |
| 139 | 16 | 2.57 | 119 | 15.3 | 40 | 16 | 1.74 | 176 | 14.1 |
| 128 | 16 | 2.53 | 121 | 15.2 | 39 | 16 | 1.72 | 178 | 14.1 |
| 118 | 16 | 2.48 | 123 | 15.2 | 38 | 16 | 1.7 | 180 | 14.1 |
| 110 | 16 | 2.43 | 126 | 15.1 | 37 | 16 | 1.68 | 182 | 14.1 |
| 102 | 16 | 2.39 | 128 | 15 | 36 | 16 | 1.66 | 184 | 14 |
| 96 | 16 | 2.35 | 130 | 15 | 35 | 16 | 1.64 | 186 | 14 |
| 90 | 16 | 2.32 | 132 | 14.9 | 34 | 16 | 1.61 | 190 | 14 |
| 85 | 16 | 2.28 | 134 | 14.8 | 33 | 16 | 1.59 | 192 | 14 |
| 81 | 16 | 2.25 | 136 | 14.8 | | | | | |

FIG. 14

Required SNR for 16 QAM Large Packets as FEC T is increased and FEC K is decreased Required SNR for 16 QAM Small Packets as FEC T is increased and FEC K is decreased Required SNR in AWGN versus Spectral Efficiency

| Table 3 Recommended Modulations for AWGN Levels in the Upstream Channel ||||
| SNR Range |||  Modulation to Use |
|---|---|---|---|
| | SNR > | 27.7 dB | 256 QAM |
| 24.2 dB < | SNR < | 27.7 dB | 128 QAM |
| 21.3 dB < | SNR < | 24.2 dB | 64 QAM |
| 18.1 dB < | SNR < | 21.3 dB | 32 QAM |
| 14.9 dB < | SNR < | 18.1 dB | 16 QAM |
| 11.8 dB < | SNR < | 14.9 dB | 8 QAM |
| | SNR < | 11.8 dB | QPSK |

| Table 4. Burst Profiles vs. AWGN | | | | |
|---|---|---|---|---|
| SNR, dB | QAM | RS_T | RS_K | # MS | Spec Eff, bits/sec/Hz |
| 33.2 | 256 | 0 | 255 | 50 | 6.11 |
| 29.7 | 256 | 4 | 219 | 51 | 5.99 |
| 29.1 | 256 | 6 | 219 | 52 | 5.88 |
| 28.6 | 256 | 8 | 219 | 53 | 5.77 |
| 28.1 | 256 | 11 | 219 | 54 | 5.66 |
| 27.8 | 256 | 13 | 219 | 55 | 5.56 |
| 27.7 | 128 | 2 | 219 | 57 | 5.36 |
| 26.8 | 128 | 4 | 219 | 58 | 5.27 |
| 26.2 | 128 | 6 | 219 | 59 | 5.18 |
| 25.7 | 128 | 8 | 219 | 60 | 5.09 |
| 25.4 | 128 | 10 | 219 | 61 | 5.01 |
| 25.1 | 128 | 12 | 219 | 62 | 4.93 |
| 24.9 | 128 | 14 | 219 | 63 | 4.85 |
| 24.6 | 128 | 16 | 219 | 64 | 4.78 |
| 24.6 | 128 | 15 | 191 | 65 | 4.7 |
| 24.2 | 64 | 3 | 219 | 67 | 4.56 |
| 23.5 | 64 | 5 | 219 | 68 | 4.49 |
| 23.2 | 64 | 6 | 219 | 69 | 4.43 |
| 22.8 | 64 | 8 | 219 | 70 | 4.37 |
| 22.4 | 64 | 10 | 219 | 71 | 4.3 |
| 22.3 | 64 | 11 | 219 | 72 | 4.24 |
| 22 | 64 | 13 | 219 | 73 | 4.19 |
| 21.8 | 64 | 15 | 219 | 74 | 4.13 |
| 21.7 | 64 | 16 | 219 | 75 | 4.07 |
| 21.5 | 64 | 16 | 191 | 76 | 4.02 |
| 21.5 | 64 | 15 | 170 | 77 | 3.97 |

| Table 4 Burst Profiles vs. AWGN (cont) | | | | |
|---|---|---|---|---|
| SNR, dB | QAM | RS_T | RS_K | # MS | Spec Eff, bits/sec/Hz |
| 21.3 | 32 | 3 | 219 | 80 | 3.82 |
| 20.9 | 32 | 4 | 219 | 81 | 3.77 |
| 20.3 | 32 | 6 | 219 | 82 | 3.73 |
| 20.1 | 32 | 7 | 219 | 83 | 3.68 |
| 19.9 | 32 | 8 | 219 | 84 | 3.64 |
| 19.6 | 32 | 10 | 219 | 85 | 3.6 |
| 19.4 | 32 | 11 | 219 | 86 | 3.55 |
| 19.2 | 32 | 13 | 219 | 87 | 3.51 |
| 19.1 | 32 | 14 | 219 | 88 | 3.47 |
| 18.9 | 32 | 16 | 219 | 89 | 3.43 |
| 18.8 | 32 | 15 | 191 | 90 | 3.4 |
| 18.7 | 32 | 16 | 191 | 91 | 3.36 |
| 18.7 | 32 | 15 | 170 | 92 | 3.32 |
| 18.6 | 32 | 16 | 170 | 93 | 3.29 |
| 18.5 | 32 | 16 | 153 | 94 | 3.25 |
| 18.4 | 32 | 16 | 139 | 96 | 3.18 |
| 18.1 | 16 | 3 | 219 | 100 | 3.06 |
| 17.8 | 16 | 4 | 219 | 101 | 3.03 |
| 17.4 | 16 | 5 | 219 | 102 | 3 |
| 17 | 16 | 7 | 219 | 103 | 2.97 |
| 16.8 | 16 | 8 | 219 | 104 | 2.94 |
| 16.6 | 16 | 9 | 219 | 105 | 2.91 |
| 16.5 | 16 | 10 | 219 | 106 | 2.88 |
| 16.3 | 16 | 11 | 219 | 107 | 2.86 |
| 16.2 | 16 | 12 | 219 | 108 | 2.83 |
| 16.1 | 16 | 13 | 219 | 109 | 2.8 |
| 15.9 | 16 | 15 | 219 | 110 | 2.78 |
| 15.8 | 16 | 16 | 219 | 111 | 2.75 |
| 15.7 | 16 | 15 | 191 | 112 | 2.73 |
| 15.6 | 16 | 16 | 191 | 113 | 2.7 |
| 15.6 | 16 | 15 | 170 | 114 | 2.68 |
| 15.5 | 16 | 16 | 170 | 115 | 2.66 |
| 15.4 | 16 | 16 | 153 | 117 | 2.61 |
| 15.3 | 16 | 16 | 139 | 119 | 2.57 |
| 15.2 | 16 | 16 | 128 | 121 | 2.53 |
| 15.2 | 16 | 16 | 118 | 123 | 2.48 |
| 15.1 | 16 | 16 | 110 | 126 | 2.43 |
| 15 | 16 | 16 | 102 | 128 | 2.39 |

FIG. 19A

| Table 4 | Burst Profiles vs. AWGN (cont) | | | |
|---|---|---|---|---|
| SNR, dB | QAM | RS_T | RS_K | # MS | Spec Eff, bits/sec/Hz |
| 14.9 | 8 | 4 | 219 | 134 | 2.28 |
| 14.6 | 8 | 5 | 219 | 135 | 2.26 |
| 14.4 | 8 | 6 | 219 | 136 | 2.25 |
| 14.1 | 8 | 7 | 219 | 138 | 2.21 |
| 14 | 8 | 8 | 219 | 139 | 2.2 |
| 13.8 | 8 | 9 | 219 | 140 | 2.18 |
| 13.6 | 8 | 10 | 219 | 141 | 2.17 |
| 13.5 | 8 | 11 | 219 | 142 | 2.15 |
| 13.4 | 8 | 12 | 219 | 143 | 2.14 |
| 13.3 | 8 | 13 | 219 | 145 | 2.11 |
| 13.2 | 8 | 14 | 219 | 146 | 2.09 |
| 13.1 | 8 | 15 | 219 | 147 | 2.08 |
| 13 | 8 | 16 | 219 | 148 | 2.06 |
| 12.9 | 8 | 15 | 191 | 150 | 2.04 |
| 12.9 | 8 | 16 | 191 | 151 | 2.02 |
| 12.8 | 8 | 15 | 170 | 152 | 2.01 |
| 12.7 | 8 | 16 | 170 | 153 | 2 |
| 12.6 | 8 | 16 | 153 | 156 | 1.96 |
| 12.6 | 8 | 16 | 139 | 160 | 1.91 |
| 12.5 | 8 | 16 | 128 | 161 | 1.9 |
| 12.4 | 8 | 16 | 118 | 166 | 1.84 |
| 12.3 | 8 | 16 | 110 | 168 | 1.82 |
| 12.3 | 8 | 16 | 102 | 171 | 1.79 |
| 12.2 | 8 | 16 | 96 | 174 | 1.76 |
| 12.2 | 8 | 16 | 90 | 176 | 1.74 |
| 12.1 | 8 | 16 | 85 | 179 | 1.71 |
| 12.1 | 8 | 16 | 81 | 182 | 1.68 |
| 12 | 8 | 16 | 77 | 184 | 1.66 |
| 12 | 8 | 16 | 73 | 187 | 1.63 |
| 11.9 | 8 | 16 | 70 | 190 | 1.61 |
| 11.9 | 8 | 16 | 67 | 192 | 1.59 |

| Table 4 | Burst Profiles vs. AWGN (conc) | | | |
|---|---|---|---|---|
| SNR, dB | QAM | RS_T | RS_K | # MS | Spec Eff, bits/sec/Hz |
| 11.8 | 4 | 2 | 219 | 197 | 1.55 |
| 11.3 | 4 | 3 | 219 | 199 | 1.54 |
| 11 | 4 | 4 | 219 | 201 | 1.52 |
| 10.7 | 4 | 5 | 219 | 202 | 1.51 |
| 10.4 | 4 | 6 | 219 | 204 | 1.5 |
| 10.2 | 4 | 7 | 219 | 206 | 1.48 |
| 10.1 | 4 | 8 | 219 | 208 | 1.47 |
| 9.9 | 4 | 9 | 219 | 209 | 1.46 |
| 9.8 | 4 | 10 | 219 | 211 | 1.45 |
| 9.6 | 4 | 11 | 219 | 213 | 1.43 |
| 9.5 | 4 | 12 | 219 | 215 | 1.42 |
| 9.4 | 4 | 13 | 219 | 216 | 1.41 |
| 9.3 | 4 | 14 | 219 | 218 | 1.4 |
| 9.2 | 4 | 15 | 219 | 220 | 1.39 |
| 9.1 | 4 | 16 | 219 | 222 | 1.38 |
| 9.1 | 4 | 15 | 191 | 224 | 1.36 |
| 9 | 4 | 16 | 191 | 226 | 1.35 |
| 9 | 4 | 15 | 170 | 228 | 1.34 |
| 8.9 | 4 | 16 | 170 | 229 | 1.33 |
| 8.8 | 4 | 16 | 153 | 233 | 1.31 |
| 8.7 | 4 | 16 | 139 | 237 | 1.29 |
| 8.6 | 4 | 16 | 128 | 241 | 1.27 |
| 8.5 | 4 | 16 | 118 | 248 | 1.23 |
| 8.5 | 4 | 16 | 110 | 252 | 1.21 |

FIG. 19B

DYNAMIC ADAPTATION OF IMPAIRED RF COMMUNICATION CHANNELS IN A COMMUNICATION SYSTEM

CROSS-REFERENCE TO RELATED APPLICATIONS

This application claims priority to U.S. Provisional Application No. 60/377,242, filed May 3, 2002, entitled "Dynamic Adaptation to Impaired RF Communication Channels in a Communication System," incorporated herein by reference in its entirety.

This application is related to U.S. patent application Ser. No. 09/988,065, entitled "Method and Apparatus for the Detection and Classification of Impairments on an RF Modulated Network," filed Nov. 16, 2001, by Daniel Howard, incorporated herein by reference in its entirety.

BACKGROUND OF THE INVENTION

1. Field of the Invention

The present invention relates generally to telecommunications systems and, more particularly, to shared access RF networks.

2. Background

In conventional shared access communication networks, such as a hybrid fiber coaxial (HFC) network, a bidirectional communication path is maintained between a network headend and each remote point in the network. The communication path simultaneously carries broadband radio frequency (RF) signals in two directions on the same medium by dividing the frequency spectrum of the bidirectional communication path. Frequency division multiplexing (FDM) allows two or more simultaneous and continuous channels to be derived from a shared access transmission medium. FDM assigns separate portions of the available frequency spectrum to the "downstream" or "forward path" direction from a headend signal source to a plurality of remote points, and a second frequency range for carrying signals in the "upstream" or "return path" direction from each remote point to the headend.

For example, a conventional cable modem system provides a point-to-multipoint topology for supporting data communication between a cable modem termination system (CMTS) at a cable headend and multiple cable modems (CM) at the customer premises. In such systems, information is broadcast on downstream channels from the CMTS to the cable modems as a continuous transmitted signal in accordance with a time division multiplexing (TDM) technique. In contrast, information is transmitted upstream from each of the cable modems to the CMTS on the upstream channels as short burst signals in accordance with a time division multiple access (TDMA) technique. The upstream transmission of data from the cable modems is managed by the CMTS, which allots to each cable modem specific slots of time within which to transfer data.

Conventional cable modem systems utilize DOCSIS-compliant equipment and protocols to carry out the transfer of data packets between multiple cable modems and a CMTS. The term DOCSIS (Data Over Cable System Interface Specification) generally refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems.

The most current version of the DOCSIS specification is DOCSIS 2.0. In DOCSIS 2.0, advanced physical layer technology is added for which some of the benefits include more robust operation in impaired RF upstream channels.

One technical challenge in operating a network having a bidirectional communication path on a shared medium between the headend and each remote point is maintaining network integrity for signals transmitted in the forward path and return path directions. Noise and other undesirable energy originating at one remote point or at any point along the return path from that remote point can impair network communications for all remote points in the network. Similarly, where noise and undesirable energy from one remote point is combined with noise and or other RF impairments from other remote points in the network, network communications are impaired.

RF impairments occur in many forms or types including, but not limited to, impulse and/or burst noise, common path distortion, and ingress such as interference from radio communication and navigation signals. Impulse noise or burst noise consists of high-power, short-duration energy pulses. The high-power energy pulse results in a significant increase in the noise floor while the short duration results in an elusive disruption whose source or entry point into the network is difficult to pinpoint.

Ingress is unwanted energy that enters a communication path from a source external to the communication path. Ingress often comprises radio and/or navigational communication signals propagated over the air that enter a weak point in a wireline network, although it may also comprise impulse and/or burst noise that is similarly propagated over the air to enter the network at a weak point. Weak points in the network often occur where there is a shield discontinuity, improperly grounded electrical device, or a faulty connector at or near a remote point. When radio frequency carriers from shortwave radio, citizen's band radio, or other broadcast sources enter the network at these weak points, they cause interference peaks at specific carrier frequencies in the communication path.

Common path distortion is the result of second and higher order mixing products from the downstream channel that couple to the upstream channel and occur when physical electromechanical connectors corrode and oxidize creating point contact diodes. The effect of these diodes in the return path is additional interference that is generally narrowband at fixed frequencies spaced at regular 6 MHz intervals in the frequency spectrum.

Conventional techniques for mitigating the above-mentioned and other impairments tend to be stationary in time. That is, the techniques assume the presence of relatively static impairments. However, the impairments mentioned above tend to be highly dynamic. That is, the impairments tend to change both in type and level or extent over time. Thus, static impairment mitigation techniques tend to be ineffective against the dynamic impairments. Therefore, there is a need to mitigate dynamic impairments in a communication system.

BRIEF SUMMARY OF THE INVENTION

An embodiment of the present invention includes a method of dynamically adapting a communication channel to channel impairments. This is referred to as dynamic adaptation of the communication channel. The method comprises:

operating the communication channel in accordance with a set of operating parameters;

determining a channel impairment characteristic related to a channel impairment present in the communication channel;

determining a quality metric indicative of channel performance for the communication channel; and adjusting one or more operating parameters in the set of operating parameters when the quality metric is not within a target range.

Further embodiments, features, and advantages of the present invention, as well as the structure and operation of various embodiments of the present invention, are described in detail below with reference to the accompanying drawings. System adaptation is described in detail in Section IV below.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 6 depicts a spectrum of main CPD frequencies for an incrementally related carrier (IRC) plant in accordance with embodiments of the present invention.

FIG. 7 illustrates a spectrum of main and sideband CPD frequencies resulting from the use of offset carriers in accordance with embodiments of the present invention.

FIG. 8 illustrates a sideband frequency structure about a single main CPD frequency in accordance with embodiments of the present invention.

FIG. 14 is a table (Table 2) of Required signal-to-noise ratio (SNR) for Varying FEC in sixteen (16) Quadrature Amplitude Modulation (QAM).

Figures 17, 18:
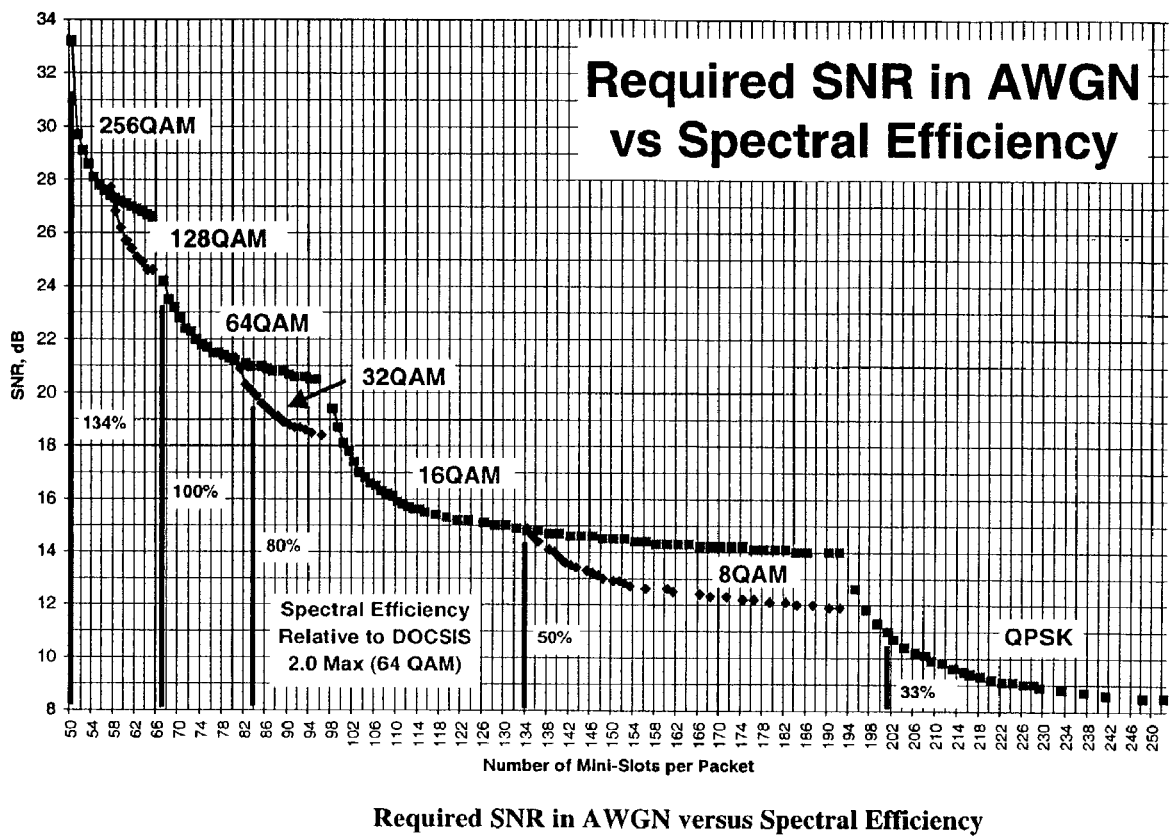
FIG. 17 is a plot of Required SNR in Average White Gaussian Noise (AWGN) versus Spectral Efficiency.
FIG. 18 is a Table (Table 3) corresponding to the plot of FIG. 17.

FIGS. 19A and 19B together represent a table (Table 4) that is a more detailed version of the relationships depicted in FIGS. 17 and 18.

Figure 20:
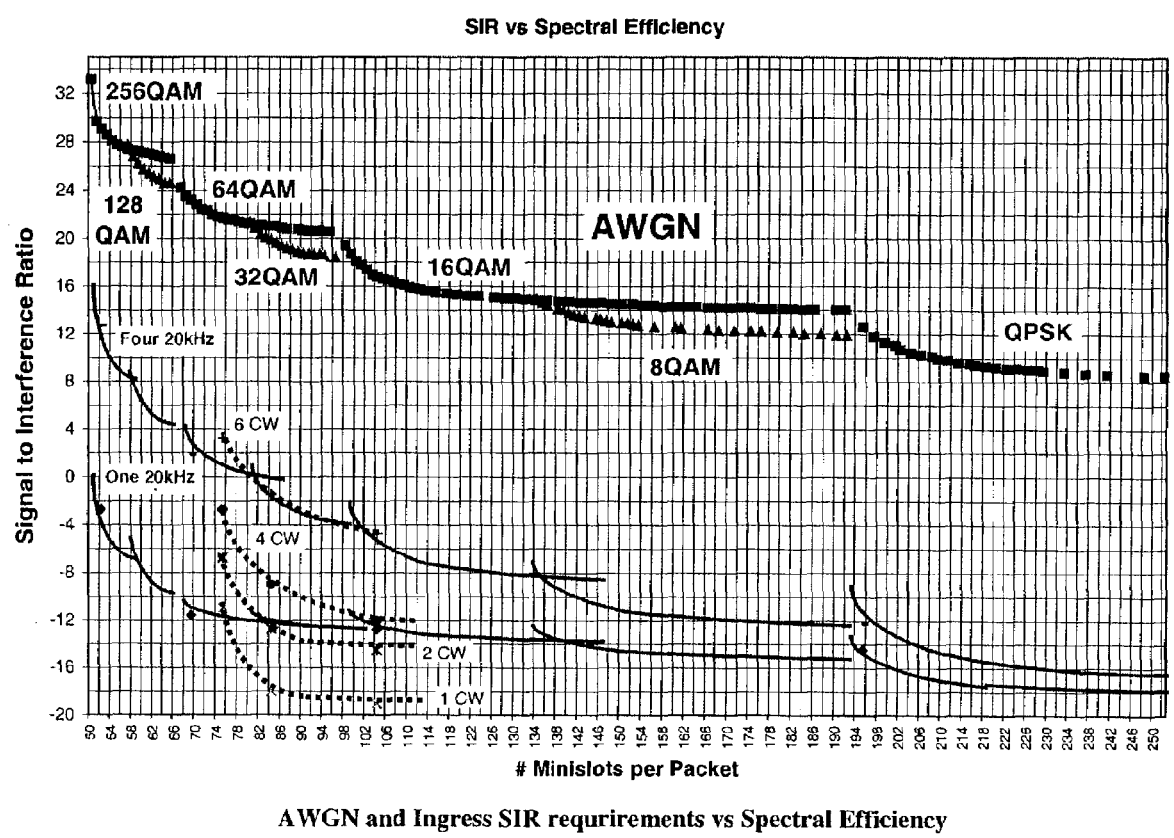

FIG. 20 is a plot of AWGN and Ingress signal-to-impairment (SIR) requirements vs. Spectral Efficiency corresponding to various models and measurements in the present invention.

Figure 21:
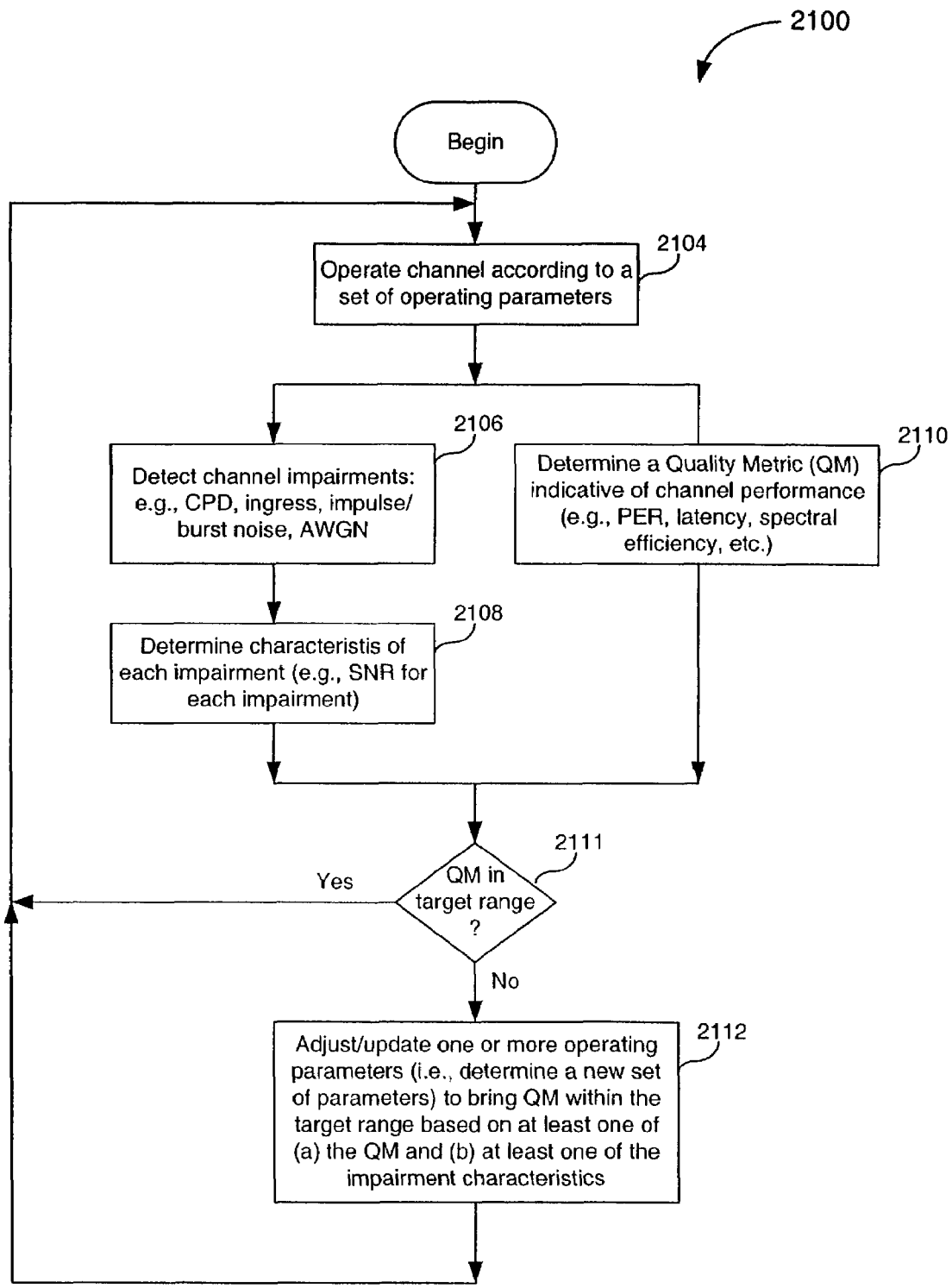

FIG. 21 is a flow chart of a method of dynamically adapting the operating parameters of a communication channel to channel impairments in the channel.

Figure 22:
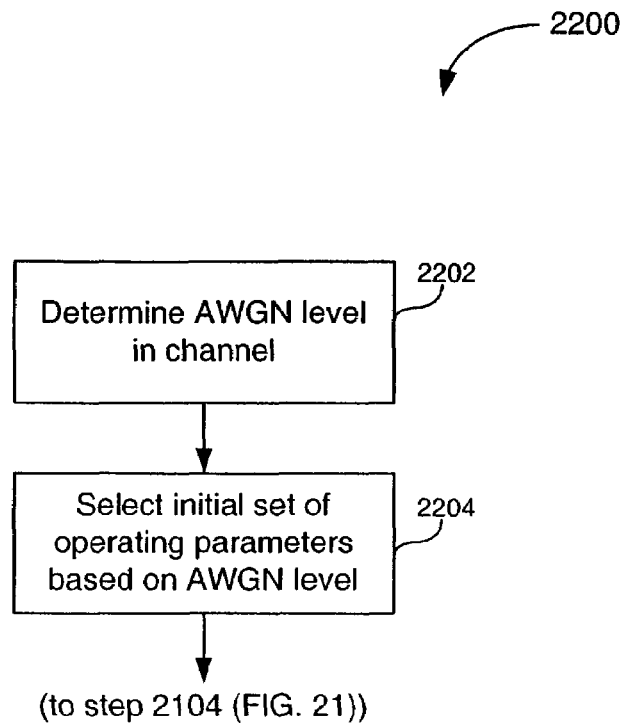

FIG. 22 is a flow chart of an example method used to establish initial operating parameters for a channel.

Figure 23:
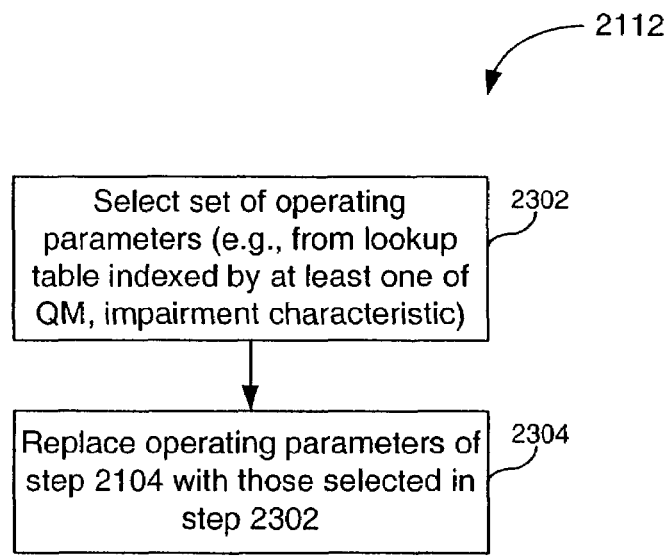

FIG. 23 is a flow chart of an example method expanding on the method of FIG. 21.

Figure 24:
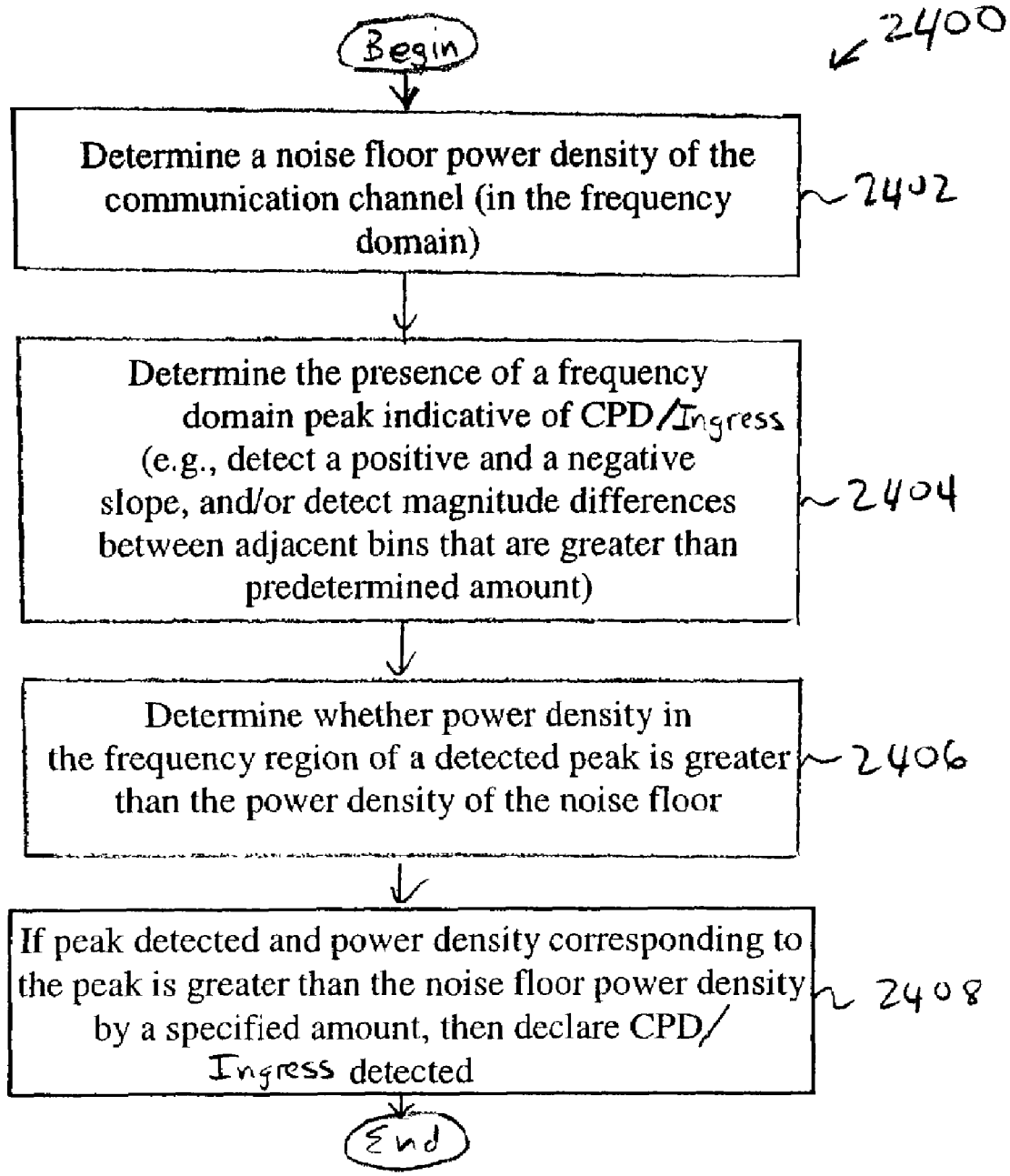

FIG. 24 is a flow chart of another example method of identifying CPD and/or ingress.

Figure 25:
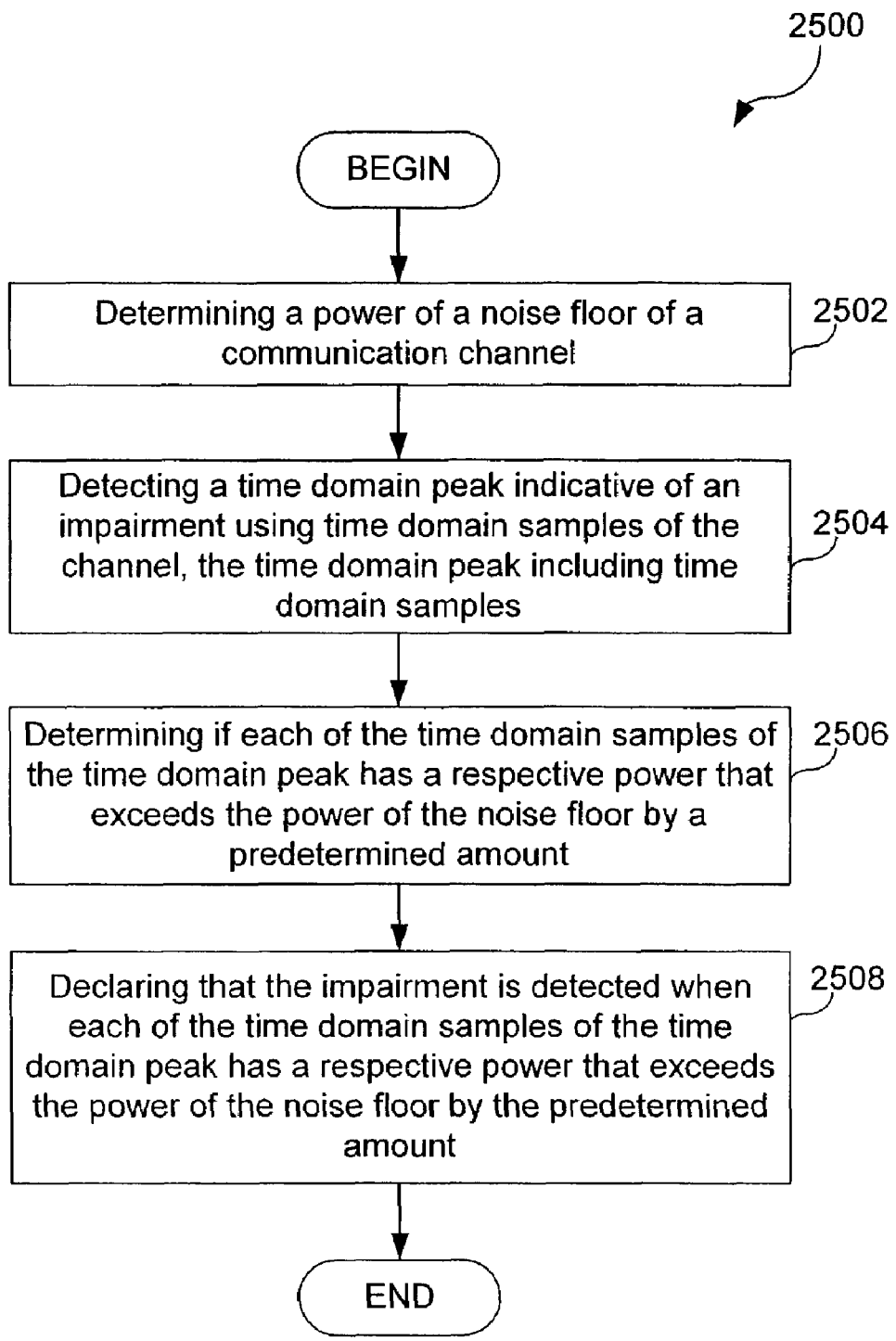

FIG. 25 is a flow chart of another example method of identifying impulse/burst noise.

The present invention will now be described with reference to the accompanying drawings. In the drawings, like reference numbers indicate identical or functionally similar elements.

DETAILED DESCRIPTION OF THE INVENTION

I. Overview

An exemplary embodiment of the present invention provides a method and apparatus for adapting a communication channel to RF impairments (also referred to as channel impairments) in a communication network, such as a shared access communication network. In an embodiment of the present invention the communication network is a cable modem system. In operation, an exemplary embodiment of the present invention first characterizes channel impairments and then adapts the communication channel to the characterized impairments.

In order to appreciate the advantages of the present invention, it will be beneficial to describe the invention in the context of an exemplary bi-directional communication network, such as for example, a hybrid fiber coaxial (HFC) network. Description in these terms is provided for convenience only. It is not intended that the invention be limited to application in this example environment. Based on the teachings provide herein, persons skilled in the art will be able to implement the invention in alternative environments.

II. Cable Modem System

Figure 1:
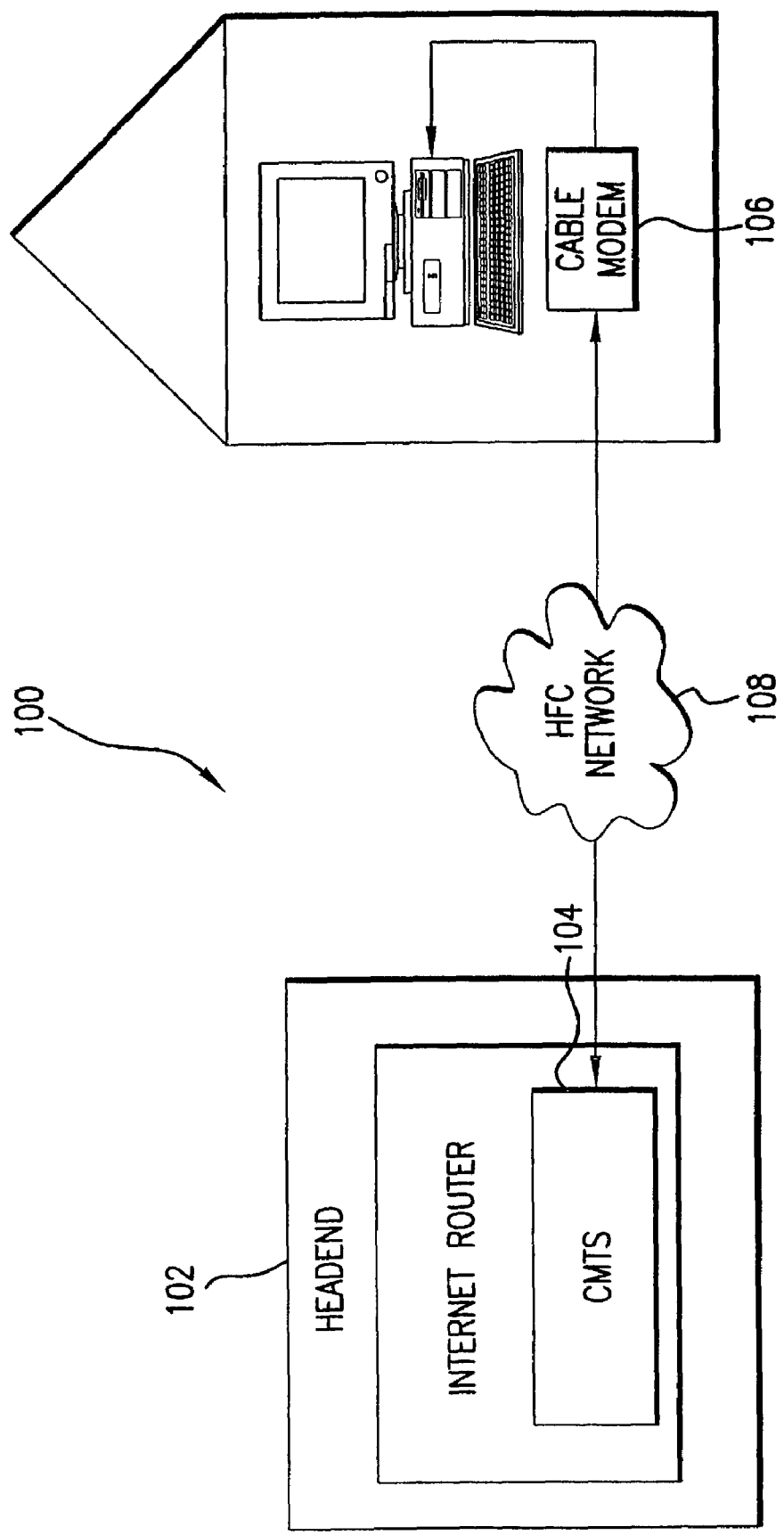
FIG. 1 is a block diagram of a cable modem system that includes an RF impairment detection and dynamic adaptation system in accordance with embodiments of the present invention.

A block diagram of an example cable modem system in which embodiments of the present invention may operate is depicted in FIG. 1. An exemplary DOCSIS-compatible network 100 includes a headend 102 having a cable modem termination system (CMTS) 104 located at a cable company facility. The CMTS 104 functions as a modem that services a plurality of subscribers. Each subscriber has at least one customer premises equipment, such as a cable modem 106, connected to the CMTS 104 via a hybrid fiber coaxial (HFC) network 108. An exemplary CMTS for use with the present invention is disclosed in U.S. patent application Ser. No.

09/574,558, entitled "Cable Modem Apparatus and Method," filed May 19, 2000, which is incorporated by reference in its entirety.

III. Cable Modem Termination System

Figure 2:
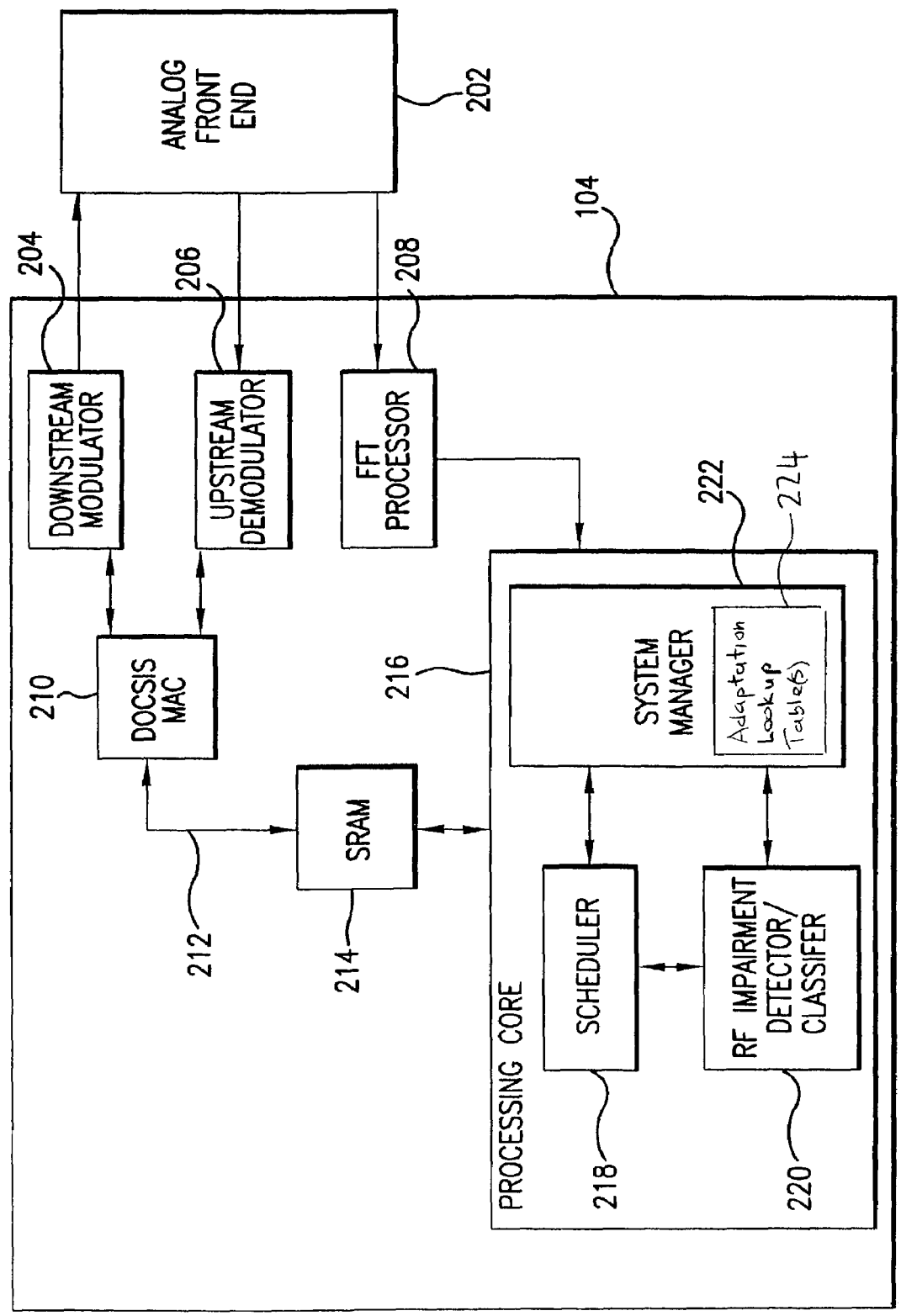
FIG. 2 is a block diagram of a cable modem termination system (CMTS) in accordance with embodiments of the present invention.

Referring to FIG. 2, the CMTS 104 includes a downstream modulator 204 for facilitating the transmission of data communications to a plurality of cable modems and an upstream demodulator 206 for facilitating the reception of data communications from the cable modems. On a given cable upstream upstream channel, a plurality of RF impairments may simultaneously exist, including for example, common path distortion (CPD), periodic impulse/burst noise (PIB), and ingress. In operation, it is difficult to adapt ingress cancellation filters if burst noise is present during adaptation update cycles. Similarly, an ingress talk-spurt that turns on when the system is trying to identify or adapt to PIB noise may also make correction difficult.

Therefore, in accordance with embodiments of the present invention, the exemplary CMTS 104 includes a processing core 216, such as a MIPS core, that includes an RF Impairment Detector and Classifier (IDC) 220. The RF IDC 220 comprises a software module that identifies RF impairments on the upstream channel.

The exemplary CMTS 104 utilizes a burst receiver, rather than a continuous receiver, to receive time division multiple access (TDMA) data packets from cable modems via upstream communication channels. The burst receiver of the CMTS 104 comprises an analog front-end 202 having an analog-to-digital converter (not shown) that receives analog data packets from an upstream channel and converts the analog data packets into digital data packets. The upstream demodulator 206 amplifies the digitized data packets and demodulates the amplified signal with recovered clock and carrier timing. Matched filters and adaptive filters remove multi-path propagation effects and narrowband co-channel interference. An integrated decoder performs error correction and forwards the processed data in either parallel or serial MPEG-2 format to a DOCSIS media access controller (MAC) 210. The DOCSIS MAC 210 extracts DOCSIS MAC frames from MPEG-2 frames, processes MAC headers, and filters and processes messages and data. Upstream data packets and message packets are then placed in system memory 214 via an internal system bus (ISB) 212.

The RF IDC 220 interfaces with a scheduler 218 and a system manager 222 which comprise additional software components within the processing core 216. The RF IDC 220 accepts data forwarded to system memory 214 by the upstream demodulator 206, DOCSIS MAC 210. RF IDC 220 also receives from an FFT processor 208 both time samples of and Fast Fourier Transform (FFT) information related to upstream channels. RF IDC 220 alone, or in combination with FFT processor 208, can be considered an upstream channel spectrum monitor. The RF IDC 220 examines a variety of data including, but not limited to, forward error correction (FEC) errors, packets that contain errors, FFT output data, time sample data, and signal-to-noise (SNR) in order to identify when particular RF impairments are present and to characterize any detected impairments. IDC 220 also generates channel performance data, referred to as channel performance metrics. Alternatively, system manager 222 generates the channel performance data/performance metrics. Based on detected RF impairment information and the channel performance data, system manager 222 adapts the system operation to increase its robustness, efficiency, capacity, or any combination of these.

With regard to system adaptation, processing core 216 has access to an Adaptation Lookup Table 224 stored in a memory of CMTS 104. Lookup Table 224 includes one or more adaptation lookup tables. Each adaptation lookup table lists multiple sets of channel operating parameters (also referred to as burst profiles) that may be used to adapt system operation, and particularly, communication channels, to RF impairments. For example, system manager 222 receives information characterizing RF impairments from IDC 220. System manager 222 uses the impairment information, and channel performance data, to access appropriate channel operating parameters stored in the lookup tables. System manager 222 uses these accessed operating parameters to adapt the communication channel(s) to the detected impairments. Example lookup tables and system adaptations are described in further detail below, in connection with FIGS. 14-23.

Although the above description is made with reference to a software system inside a processing core, one of skill in the present art will be able to construct the above system based on the disclosure contained herein in a number of ways including, but not limited to, hardware, firmware, software, or any combination of these elements. Additionally or alternatively, each or all of the impairments detected may be detected and characterized by multiple processors, hardware systems, or firmware systems, or any combination of these elements.

A. Common Path Distortion Detection System

Figure 3:
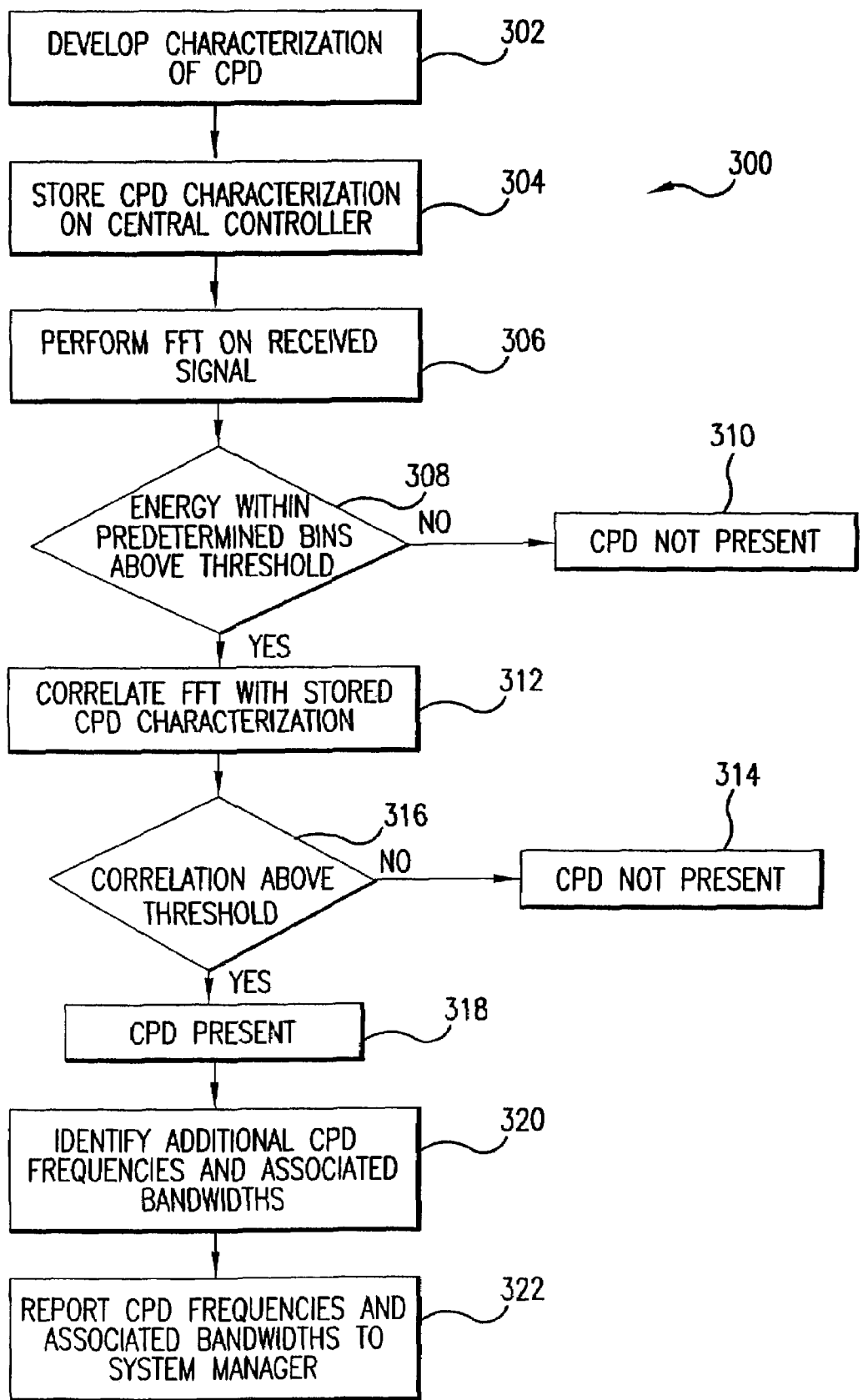
FIG. 3 is a flow diagram demonstrating the operation of a common path distortion (CPD) detection system in accordance with embodiments of the present invention.

Because common path distortion (CPD) is generally the most stable impairment in terms of both power and frequency, and because it is identified by specific, fixed-frequency components, a preferred embodiment of the present invention initially tests for CPD. A method 300 for identifying CPD is illustrated in FIG. 3. CPD identification begins with a characterization of the frequency spectrum resulting from second and third order mixing 302. This characterization uses the specification of the downstream spectrum to derive analytically the CPD spectrum which would result if CPD were present.

An NTSC (National Television Standards Committee) downstream signal for example, has two main peaks, one at the video carrier and another at the audio carrier. The audio carrier signal has a smaller amplitude than the video carrier signal and has a frequency that is 4.5 MHz greater than the frequency of the video carrier. Thus, if $f_V$ is the frequency of the video carrier, the frequency of the audio carrier will be $f_A = f_V + 4.5$ MHz.

Subsequent carriers for other downstream cable channels will generally be at $f_V + m*6$ MHz, $f_A + m*6$ MHz, where m=1, 2, 3, ..., within certain known frequency bands. The sum and difference frequencies, $f_j - f_i$, are used to determine the CPD frequencies that result from second order mixing products. Both positive and negative frequencies of the original spectrum are considered. The result of this computation is CPD beat frequencies at 6, 12, 18, ... m*6 MHz, with sidebands at +/−1.5 MHz around every 6 MHz beat.

Figure 4:
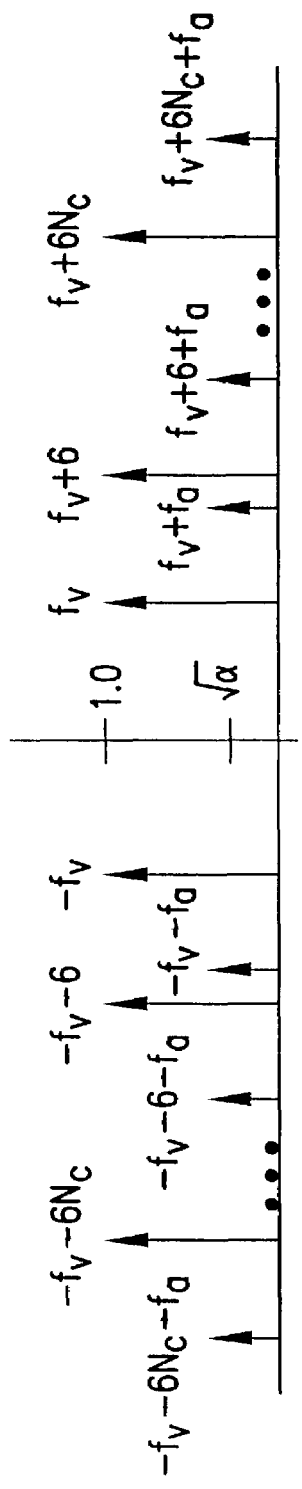
FIG. 4 illustrates a downstream frequency spectrum of an exemplary cable plant.

Thus, main, or coarse, CPD frequencies from second order mixing products in the upstream band exist at 6.0, 7.5, 10.5, 12.0, 13.5, 16.5, 18.0, 19.5, 22.5, 24.0, 25.5, 28.5, 30.0, 31.5, 34.5, 36.0, 37.5, 40.5, and 42.0 MHz. Because these CPD frequencies are invariant to downstream carrier shifts from harmonically related carrier (HRC), incrementally related carrier (IRC) or standard carrier (STD) plans, these frequencies will always be present when CPD exists. In an embodiment of the present invention, the relative amplitudes of the CPD frequencies are determined to provide greater detail in modeling and comparison to measurements by a formalism for the above computation. The formalism is based on the fact that multiplication in the time domain is equivalent to convolution in the frequency domain. Because the frequency domain representation of a real carrier at $f_V$ is $\frac{1}{2}[\delta(f+f_V)+\delta(f-f_V)]$, where $\delta$ is the Dirac delta function, if we represent the entire cable downstream spectrum as only the video and audio carriers, the normalized spectrum can be written as follows:

$$S(f)=S\{[\delta(f+f_i)+\delta(f-f_i)]+\alpha[\delta(f+f_i+4.5)+\delta(f-f_i-4.5)]\}$$

where the summation goes from i=1 to $N_c$, $N_c$ is the number of downstream cable channels, $f_i$ is the ith video carrier frequency, $\alpha$ is the amplitude of the audio carrier relative to the video carrier (−8.5 dB). The frequency spectrum is graphically illustrated in FIG. 4 where a 6-MHz spacing between video carriers is assumed. In different downstream frequency plans, the spacing between video carriers is typically 6 MHz, but varies depending on the specific plan used on the cable plant. The second order mixing products are then determined by computing:

$$S2(f)=S(f)*S(f) \text{ where * denotes convolution.}$$

In a further embodiment, a similar approach is used to derive the third order mixing products, with the result that additional frequencies at $2f_j-f_i$ and $f_j-2f_i$ are produced in the spectrum:

$$S3(f)=S2(f)*S(f)=S(f)*S(f)*S(f)$$

Figure 5:
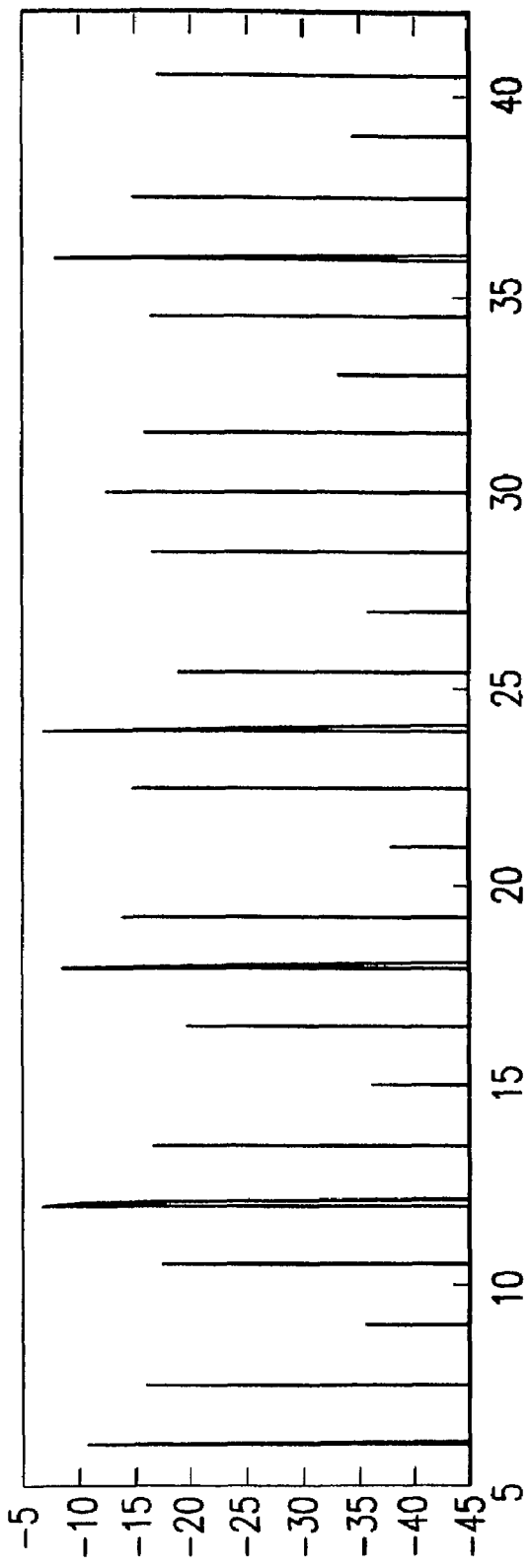
FIG. 5 illustrates a spectrum of main CPD frequencies for a harmonically related carrier (HRC) plant in accordance embodiments of the present invention.

For IIRC systems, the additional frequencies due to third order mixing products are multiples of 1.5 MHz since the original carriers are at multiples of 6 MHz plus either 0 or 4.5 MHz, and twice either the video carrier or the audio carrier minus another carrier still results in frequencies at increments of 1.5 MHz. FIG. 5 graphically illustrates a mathematically simulated frequency spectrum of second and third order CPD. The CPD frequencies at 9, 15, 21, 27, 33, and 39 MHz are solely due to third order products, while the remaining frequencies are due to both second and third order products.

Returning to FIG. 3, the simulated CPD characterization is stored on the CMTS, as shown in step 304, for correlation with received upstream signals. In operation, an exemplary embodiment of the present invention performs a Fast Fourier Transform (FFT) on the upstream band, as shown in step 306. The described exemplary embodiment preferably coordinates with the scheduler 218 to collect samples during periods where there are no scheduled upstream transmissions.

The described exemplary embodiment examines the following frequency bins for energy, as shown in step 308: 6 MHz, 12 MHz, 18 MHz, 24 MHz, 30 MHz, and 36 MHz. In embodiments, each frequency bin may represent a single frequency or a range of frequencies. Neglecting frequencies in-band of cable modem or other known upstream signals (the frequencies are retrieved from the system manager 222), if the energy within more than one of the 6 MHz frequency bins is above a predetermined threshold, the system begins the process of verifying the presence of CPD on the upstream channel. This is accomplished by examining other predicted CPD frequencies and comparing measurements at these known frequencies. Otherwise, the detection system assumes CPD is not present on the upstream channel, as shown in step 310. Alternatives to such threshold detection are described in connection with FIGS. 24 and 25.

The exemplary method for identifying CPD correlates the FFT magnitude of bins above the predetermined threshold with the simulated frequency spectrum of the CPD, as shown in step 312, resulting from second and third order mixing shown in FIG. 5. In an embodiment, the correlation is not performed over the entire frequency range. For example, the correlation may be limited to a total shift of approximately 1.5 MHz minus the frequency bin width. In a further embodiment, the magnitude of each tone in the modeled frequency spectrum shown in FIG. 5 is set to unity to eliminate multiplication steps from the correlation process.

The correlation substantially reduces the mis-classification of energy in CPD frequency bins from burst noise as CPD. The correlation results in a large peak at zero shift and at multiples of 1.5 MHz, with much lower values at other shift values. The described exemplary embodiment reduces the time required to perform the correlation process by correlating only the frequencies at 6, 12, 18, 24, 30, and 36 MHz or the aforementioned frequencies with additional tones that are +/−1.5 MHz on either side.

In an alternate embodiment, the processing time for CPD detection is further reduced by reducing or eliminating multiplications from the correlation process and instead adding the magnitudes of a plurality of FFT bins, preferably about six, that are spaced 6 MHz apart. After adding the magnitudes of the plurality of FFT bins, each bin is shifted by one in the same direction and the process is repeated until a total range of either 1.5 MHz or 6 MHz is covered. Depending on which frequencies are examined, the correlation shift process may go from zero shift to 1.5 MHz, 6.0 MHz, or any higher frequency.

If the correlation at zero shift (and multiples of 1.5 MHz and/or 6.0 MHz if used) is large relative to other shift values, preferably in the range of four to six times the other shift values, an exemplary embodiment of the present invention determines that CPD is present on the upstream channel 318. Otherwise, the detection system determines that CPD is not present 314. One of skill in the art will appreciate that alternate representations of the CPD may be used to perform the correlation process to determine whether CPD is present. These alternate representations of CPD may be based on different plant frequency plans (e.g., HRC, IRC, or Standard), or on a reduced complexity model of the downstream to simplify correlation processing.

For example, IRC plans have carrier frequencies which are offset by 0.25 MHz from those of HRC plans. While the offset does not affect the location of the second order mixing products, it does affect the location of third order mixing products. For example, in an IRC or Standard plant, the frequency of the audio carrier of Channel 19 is 151.25+4.5=155.75 MHz. Two times the frequency of the video carrier of Channel 4 is 2*67.25=134.5 MHz. The difference between the two is 21.25 MHz. Thus, referring to the CPD frequency spectrum of an IRC plant illustrated in FIG. 6, a key indication of whether the plant is HRC or Standard/IRC is the presence of CPD frequencies at X.25 MHz or X.75 MHz locations. Standard and IRC plans produce these coarse CPD frequencies, while HRC plans do not. This calculation can be performed in the CMTS in order to eliminate the need for entering actual downstream frequencies, or the plant frequency plan, into the CMTS during initialization. On the other hand, an embodiment which minimizes calculations in the CMTS involves the user entering the type of plant frequency plan (HRC, IRC, or Standard) into the CMTS so that the CMTS may determine which model of CPD spectrum to use in detecting the presence of CPD.

Returning to FIG. 3, an exemplary embodiment of the present invention examines additional frequencies based on the plant frequency plan (STD, IRC, or HRC) to further characterize the CPD frequencies that the system manager 222 should avoid when frequency hopping, as shown in step 320. This step is necessary since not all frequencies predicted by the model may in fact be strong enough to cause interference when CPD exists on a given plant. For example, the FCC requires cable operators to offset the carriers in certain bands by either 25 kHz or 12.5 kHz to prevent interference with aeronautical radio communications in those bands. The convolution of these carrier offsets result in additional CPD frequencies.

Second order difference frequencies between an offset carrier and a non-offset carrier produce CPD frequencies at 12.5 and 25 kHz offsets from the previously predicted frequencies. Third order offset products produce additional CPD frequencies at 37.5 kHz, 50 kHz, 62.5 kHz, etc. from the non-offset products. These third order offset products have lower amplitudes because the number of cable channels that are offset is less than the number which are not offset.

FIG. 7 graphically illustrates the CPD frequency spectrum with offset frequencies on an IRC plan. The coarse structure is substantially identical to that in FIG. 6. However, referring to FIG. 8, if a single 6 MHz channel, for example 18 MHz, is examined, the sidebands around each coarse CPD frequency are identified and, if desired, avoided. These offsets differ by either 12.5 kHz or 25 kHz from the nominal downstream frequencies.

Tables of plant frequency plans can be used to calculate the CPD spectrum. For example in the United States, the most common frequency plans are Standard (STD), incrementally-related coherent (IRC), and harmonically-related coherent (HRC). In other countries, other frequency plans may exist, and will lead to different CPD spectrum models; however the method for determining the CPD spectrum is identical to that presented here.

Further, it is possible to identify whether the CPD frequency spectrum results from a plant amplifier imbalance or from plant oxidation. For example, a plant amplifier imbalance results in third order mixing products dominating second order mixing products. This imbalance alters the relative strength of CPD frequencies with respect to each other. The measured CPD spectrum can thus be compared with simulated CPD spectra caused by plant oxidation.

Thus, in an embodiment of the present invention, the source of the CPD spectra is determined by correlating the FFT results with simulated CPD spectra from causes of CPD including, but not limited to, plant oxidation and plant amplifier imbalance. In such an embodiment, adjustments based on the particular plant frequency plan (STD, IRC, or HRC) are incorporated into the simulated spectra as previously described.

One of ordinary skill in the art will appreciate that other methods that rely on examination of specific CPD frequencies produced by one cause of CPD, but not another, may also be developed. The disclosed method for distinguishing the separate causes of CPD is by way of example only and not by way of limitation.

Returning to FIG. 3, the detection system reports CPD frequencies and the likely cause of the CPD to the system manager 222 in the processing core 216, as shown in step 322. The present invention provides the scheduler 218 with the ability to avoid CPD frequencies when frequency hopping and allows the system manager 222 to notify the cable operator of the most likely cause of CPD.

Figure 9:
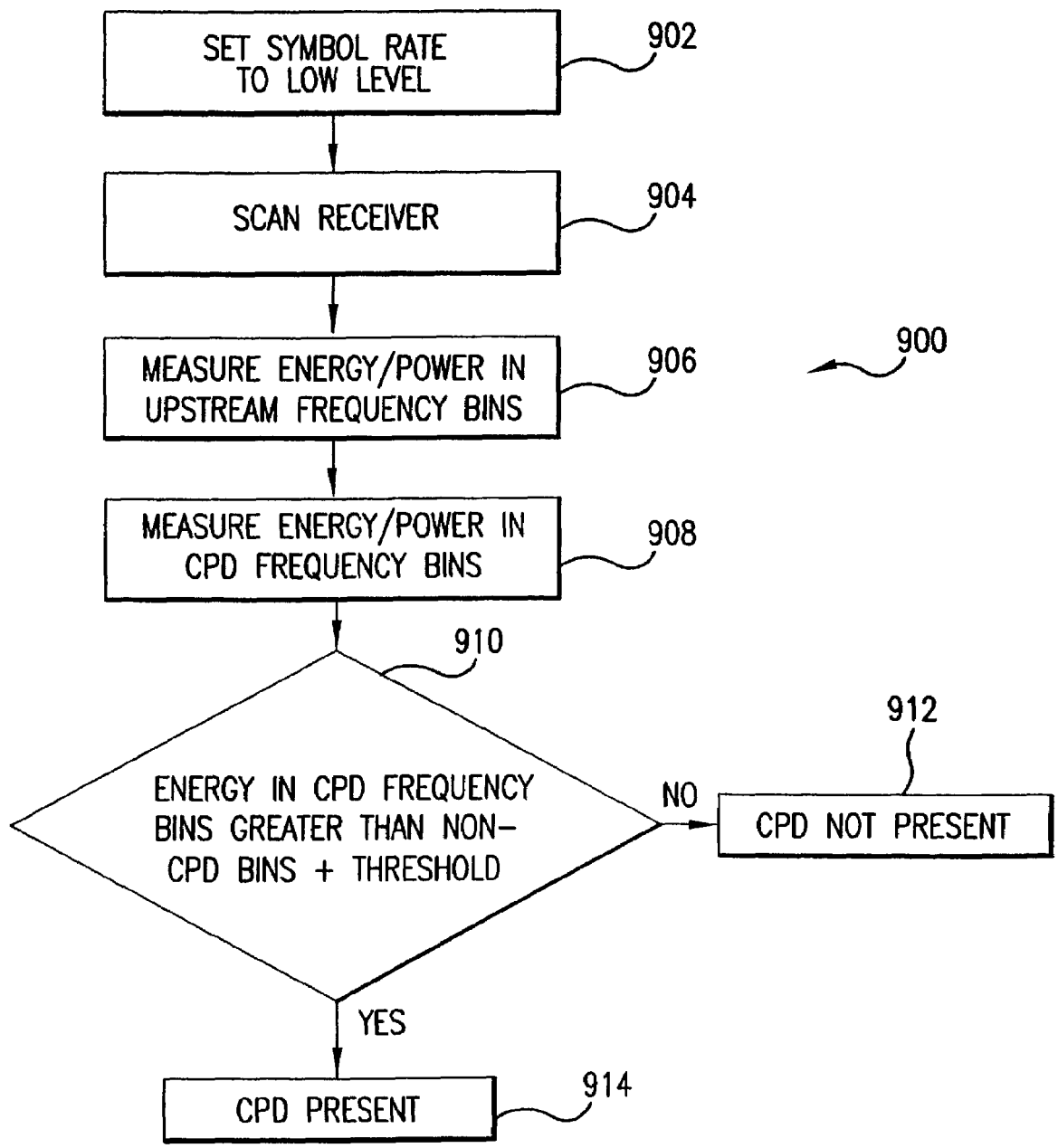
FIG. 9 is a flow diagram demonstrating the operation of a CPD detection system when the system does not use a frequency conversion process (e.g., a Fast Fourier Transform (FFT)) on measured data in accordance with embodiments of the present invention.

In an embodiment, the FFT processor 208 may be part of the CMTS 104, as shown in FIG. 2. In an alternate embodiment, the FFT processor 208 is off chip from the CMTS system 104. However, if an FFT processor is not available, an alternate embodiment of the present invention determines that CPD is present on the upstream channel in accordance with the method illustrated in FIG. 9. The described method sets the symbol rate to a low level, as shown in step 902, for example in the range of about 160-320 ksymbols/sec in a DOCSIS compatible system, and scans the receiver through upstream frequencies, as shown in step 904. Because CPD frequencies are stationary with respect to time, typically on the order of minutes or even hours, the CPD spectrum (i.e., the energy captured in each upstream frequency to which the receiver is tuned) is aggregated over a period of time, preferably on the order of seconds or minutes. The detection system preferably scans for power/energy from the highest frequency bin to the lowest frequency bin. The detection system scans the receiver during periods of upstream inactivity to measure the energy at each upstream frequency, including both non-CPD frequencies, as shown in step 906, and CPD frequencies, as shown in step 908. The scanning algorithm and bin width may vary. For example, a stepped frequency with minimum symbol rate may be used. However, it will be apparent to one skilled in the relevant art that various scanning algorithms and bin widths may be used.

The CPD detection system compares the power/energy measurements in the key CPD frequencies at 6, 12, 18, 24, 30, and 36 MHz to the measured power/energy levels in other bins where CPD is not expected to occur, as shown in step 910 (as described above and further in Table 1). For example, in embodiments of the present invention, if the energy in the CPD frequency bins is four to six times greater than the energy in bins not associated with typical CPD tones for the particular frequency of the plant, the CPD detection system declares CPD present, as shown in step 914. Otherwise, the detection system determines that CPD is not present, as shown in step 912.

B. Periodic Impulse/Burst Noise Detection System

Figure 10:
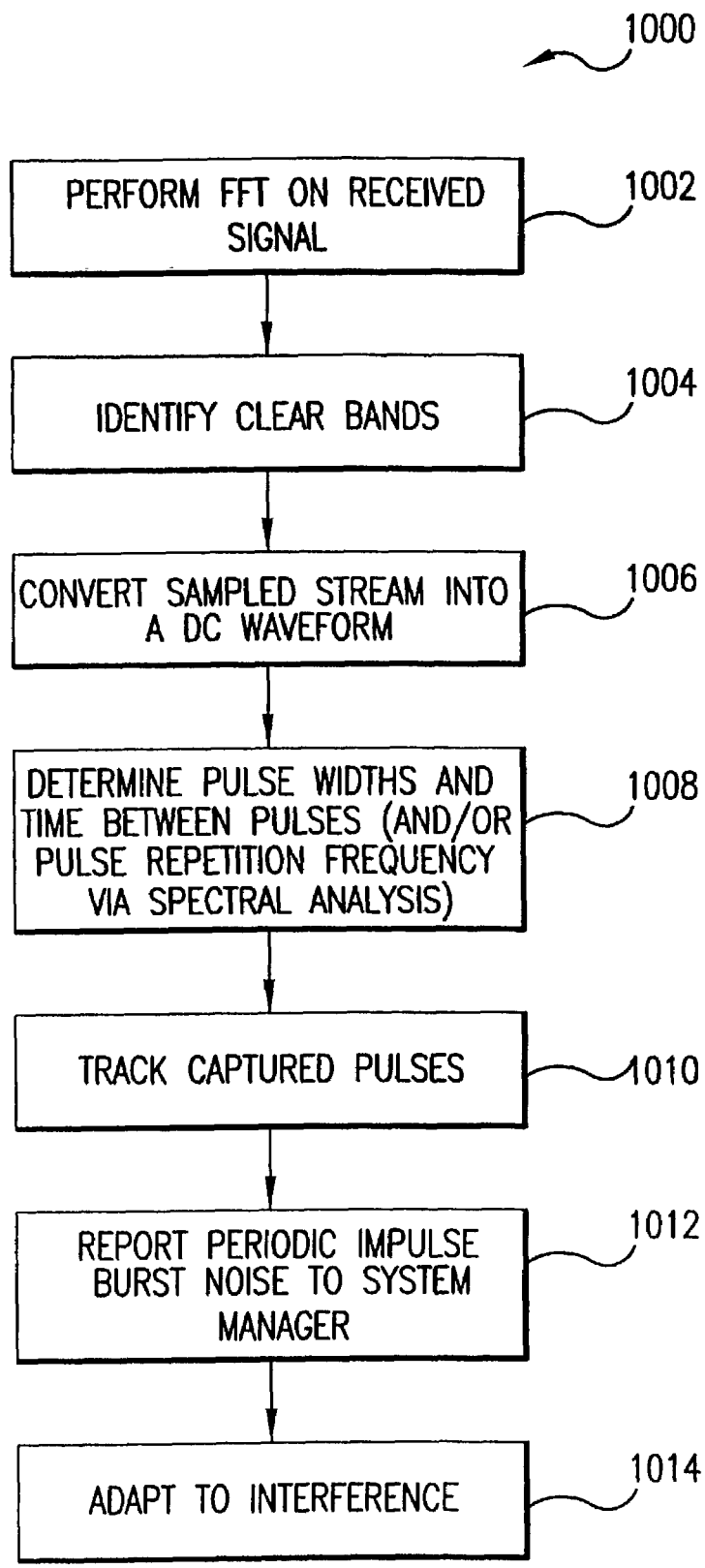
FIG. 10 is a flow diagram demonstrating the operation of a system for detecting periodic impulse/burst (PIB) noise in accordance with embodiments of the present invention.

FIG. 10 is a flow chart illustrating an exemplary method 1000 for detecting the presence of periodic impulse/burst noise (PIB) in accordance with embodiments of the present invention. The method 1000 permits further impairment detection processes to avoid scanning PIB when detecting and classifying ingress and updating and/or adapting an ingress cancellation filter. In accordance with the exemplary method 1000, an FFT of the entire upstream signal is used to gather the frequency spectrum from which PIB is detected, as shown in step 1002. The impairment detection system then identifies 'clear bands,' as shown in step 1004, which comprise frequency bands without ingress and without actual upstream communication signals. In an embodiment, the impairment detection system accesses an input data table of frequencies used by current upstream services to identify bands without upstream communications.

In further embodiments, frequency bands without ingress are identified by identifying contiguous frequency bins that have energy values less than a predetermined threshold. To minimize the impact of existing periodic impulse/burst noise, an exemplary detection system captures time samples using a revisit frequency that is not a multiple of 60 Hz. This prevents the possibility of capturing the same portion of a PIB waveform in successive captures, which could preclude detection of a PIB waveform.

In operation, an exemplary detection system that includes FFT processor capability utilizes a first clear band that is preferably less than about 20 MHz and on the order of at least 1.6 MHz wide. The detection system substantially reduces the sampling frequency to substantially increase the sequence length of the captured time samples from this band. In the described exemplary embodiment, the sample record length is preferably at least 20 ms. The exemplary detection system converts the sampled stream into a DC waveform, as shown in step 1006. In an embodiment, the detection system uses envelope power detection to convert the sampled stream. However, other techniques may be used to convert a stream into a DC pulse waveform as will be appreciated by persons skilled in the art. The detection system locates the rising and falling edges of the DC pulse waveform and calculates the pulse widths as well as the durations between pulses, as shown in step 1008. In an embodiment, the PIB detection system may choose to notify the CMTS of the PIB pulse width only if the detected width is well within the capability of the system to apply forward error correction (FEC) techniques to correct errors which result from the PIB interference. If the measured PIB pulse width is larger than what can be readily corrected, or if the system is set to optimize capacity of the network, the PIB system may be instructed to further characterize and track the PIB waveforms in order to schedule around the interference.

In an embodiment of the present invention, the detection system transmits additional captured samples to a microprocessor via a microprocessor interface. The additional captured samples are used to track pulses in the waveform. The microprocessor may utilize any one of a number of tracking techniques known in the art, including but not limited to early/late gate tracking from radar literature. New tracking techniques specific to CMTS-CM interactions are also possible by using minislot registration, FEC block numbering schemes, and the like, to track the captured pulses, as shown in step 1010.

However, if the maximum record length of the time samples is less than 20 ms, time-stamps of each time sample capture are preferably correlated with previous captures so that pulse width, pulse periods, jitter and other metrics can be calculated. Further, the time between captures may be specifically scheduled by the system manager 222 so that periodic captures out of phase with periodic impulse/burst noise are avoided.

For example, the described exemplary detection system may 'scan' the available time-slots in a periodic impulse train of period T with a maximum record length of time samples captured $\tau$, and a minimum time between captures S. In operation, the detection system preferably examines time slots in the impulse train such that each time slot examined corresponds to a different position within the period of the impulse train of period T.

Figure 11:
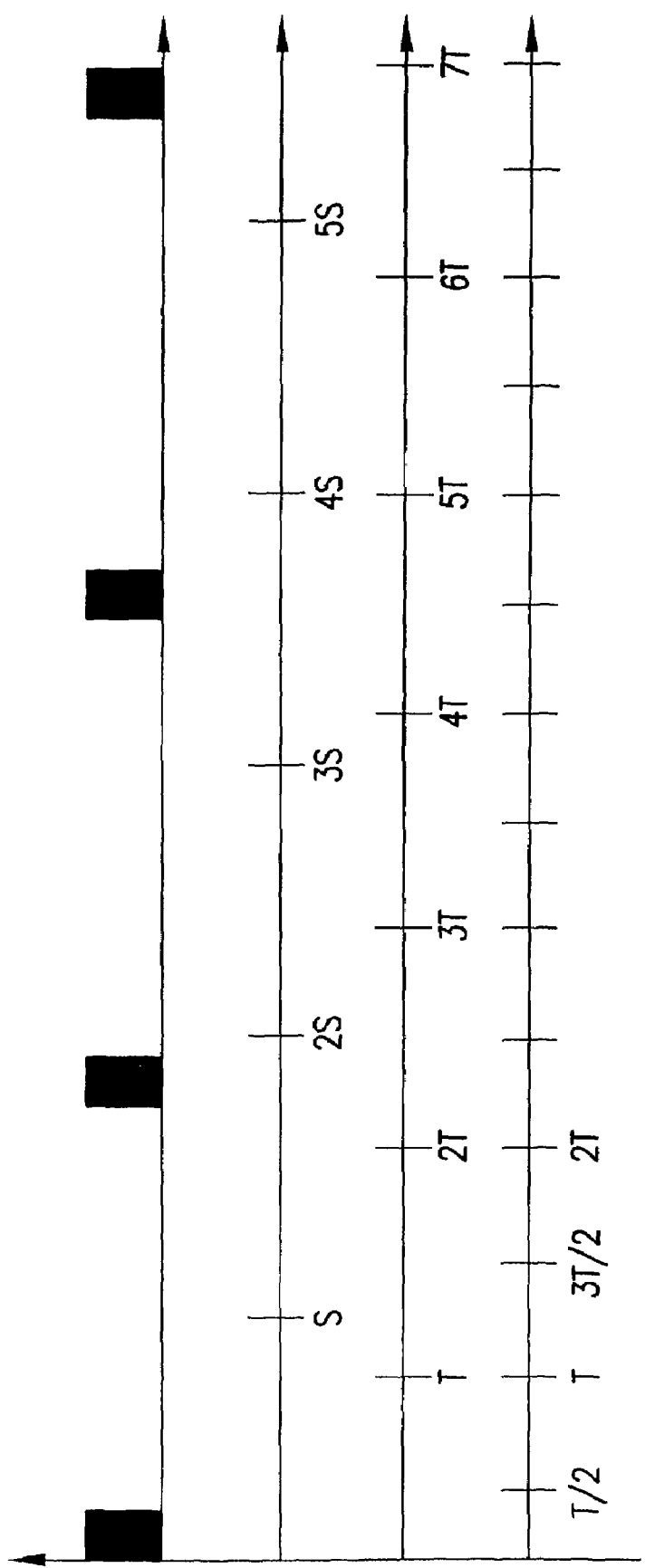
FIG. 11 illustrates capture intervals within an impulse train that are examined in a PIB detection system in accordance with embodiments of the present invention.

In an embodiment, if the initial capture is at a relative time of 0 sec, each successive capture is preferably at the ceiling $((S/T)*T+n\tau)$, where n is the index of each successive capture, and n=1, 2, 3, . . . . For example, referring to FIG. 11, the described exemplary detection system preferably examines successive time slots in the impulse train in a methodical manner. The black zones at the top of FIG. 11 are the capture intervals that are examined.

Another method that reduces the overall time to intercept of periodic impulse trains is to examine the next available opportunity (at time S). The detection system captures this time slot if the time slot corresponds to an unexamined portion of the impulse train period T. Alternatively, if the time slot does not correspond to an unexamined portion of the impulse train T, the described exemplary detection system preferably increments the time of capture by the time width of a capture and determines if this slot corresponds to an unexamined interval. In an embodiment, the system manager 222 calculates the start times of all slots within the period T (relative to a single period) and deletes start times from the table as they are examined. The system then moves to the next unexamined time-slot indicated by the table.

In both of these algorithms, each successive capture examines a different region of the period of the expected impulse train. Note that typical periodic impulse trains due to powerline phenomena have periods that conform to $1/m*60$ sec., where m=1, 2, 3, . . . , such as 16.67 ms, 8.33 ms, and so on. Therefore, one approach is to choose the lowest harmonic frequency of impulse trains, or T=16.67 ms, for the period to be scanned in the algorithms above.

Another embodiment examines the FFT of the captured trace in detail at the lowest frequencies, or at harmonics of 60 Hz, and searches for pulse recurrence frequency (PRF) lines in the spectrum. This may be difficult if a diplexor filters out most of the spectral energy below 5 MHz; hence this technique may be better suited to detection of periodic impulse trains from military signals such as radar waveforms which have higher PRFs (tens or hundreds of kilohertz) and carrier frequencies which are about 5 MHz. Once the impulse train has been detected, the described exemplary detection system acquires the impulse train. In embodiments, the acquisition process uses the assumed lowest pulse recurrence interval of 16.67 ms for powerline phenomena, or 1/PRF for higher PRF waveforms detected via the aforementioned PRF method, and schedules captures at multiples of this period. The detection system classifies capture results by denoting an energy level above a threshold as "impulse detected". To further classify the impulse train, captures at multiples of twice the period and three times the period that do not overlap with multiples of the fundamental period are examined to determine if the periodic impulse train is at a frequency of 60 Hz, 120 Hz, etc.

An embodiment of the system takes into account the fact that occasionally impulses in the periodic train will either not be present, or be present at substantially reduced levels, and hence will continue the tracking process even when impulses expected to be detected are not seen. In such embodiments, the system keeps track of the number of consecutively missed periodic impulses and only after this number exceeds a predetermined threshold will the system declare that the periodic impulse train has disappeared.

Referring back to FIG. 10, the described exemplary detection system tracks the impulse train, as shown in step 1010. Tracking of the impulse train is accomplished via any number of traditional methods from Radar theory, one example of which is early/late gate tracking of range as described in Introduction to Radar Systems by Skolnik, Published by McGraw-Hill Higher Education, the content of which is incorporated herein by reference in its entirety. In alternate embodiments, methods based on clock recovery and tracking are used.

After detection and tracking, the described exemplary detection system preferably reports the presence of periodic impulse/burst noise to the system manager 222 for adaptation and/or avoidance in the time domain, as shown in step 1012. The report includes, for example, pulse widths, pulse width jitter, pulse period, and pulse period jitter. The system manager 222, in conjunction with the scheduler 218, avoids the interference, as shown in step 1014 by not scheduling any upstream transmissions during intervals when interference is expected. Alternately, lower priority transmissions are scheduled during expected impulse intervals. These transmissions are sent with increased robustness by, for example, being transmitted with a lower order of modulation and higher forward error correction (FEC)/interleaving.

Figure 12:
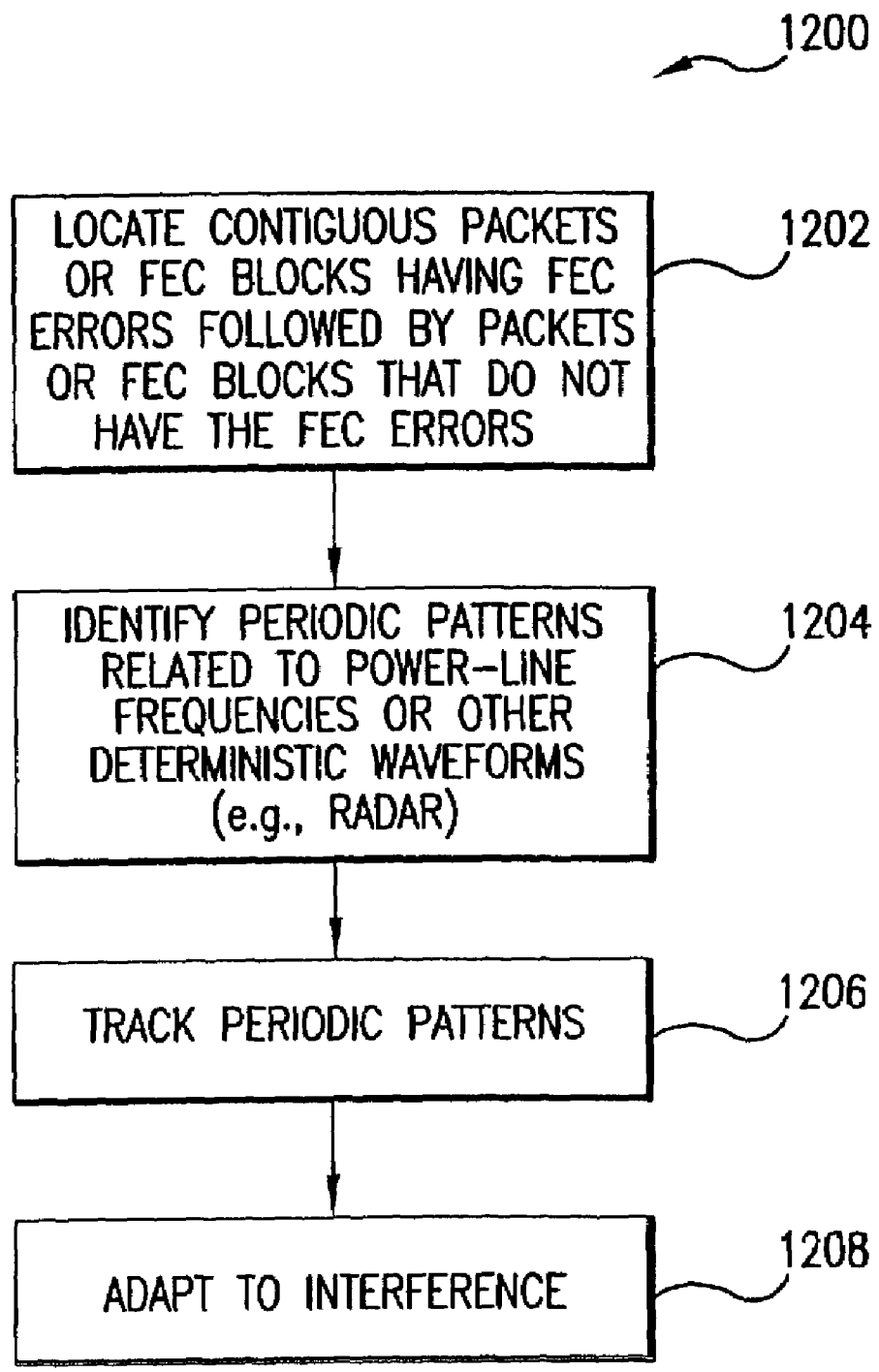
FIG. 12 is a flow diagram demonstrating the operation of a system for detecting periodic impulse burst noise in accordance with embodiments of the present invention.

An alternate embodiment for adapting to periodic impulse/burst noise indirectly ascertains the presence of noise via examination of FEC errors as a function of time. For example, uncorrected errored FEC blocks can be tracked by the receiver and kept track of for such purposes. Referring to FIG. 12, the system manager 222 preferably detects and analyzes the stream to locate contiguous groups of packets (or FEC blocks) on the upstream channel that have FEC errors followed by contiguous groups of packets (or FEC blocks) that do not have FEC errors, as shown in step 1202. The system manager 222 further analyzes the stream to determine whether this pattern repeats at periodic intervals related to power-line frequencies $\frac{1}{60}$ Hz, $\frac{1}{120}$ Hz, etc., as shown in step 1204 This determination can be made based upon timestamp information, or based on packet or FEC block sequencing/numbering which can be impressed on the packet or FEC block via other means or as a natural consequence of the application for which a packet is transmitted (e.g., voice over IP, or TCP connections with packet sequence numbers). As shown in step 1208, if the pattern is periodic, the system manager 222 and scheduler 218 avoid communicating in time-slots having FEC errors by using a tracking approach such as early-late gate tracking described above.

In an alternate embodiment, the scheduler 218 forms a null grant zone and shifts and/or expands and contracts the null grant zone in the time domain. When the FEC errors on incoming packets drop below a predetermined threshold, the impulse train has been detected, acquired, and tracked. The null grant zone is gradually narrowed and FEC robustness is increased for packets scheduled near the window if the system desires to increase throughput. As before, if the magnitude of interference permits, packets are scheduled during impulse intervals, albeit with greater robustness.

Furthermore, in some implementations of DOCSIS, altering the FEC, interleaving, and/or order of modulation on a burst by burst basis within the same Service ID (SID) is not possible. In these instances, the scheduler 218 preferably uses different SIDs or service flows, or logical channels (in DOCSIS 2.0) to differentiate traffic scheduled during impulse events and outside of impulse events. For example, in an embodiment, voice traffic with minimal FEC but lower required latency is scheduled outside of impulse intervals, while data traffic with higher FEC, interleaving, and lower order of modulation is scheduled elsewhere, including zones of impulse events. In an alternate embodiment, data traffic is scheduled during non-impulse events, while voice traffic with heavy FEC, interleaving, and low order of modulation is scheduled during impulse events. In embodiments, the choice may depend on one or more factors, including but not limited to the magnitude of impulse interference, the duty cycle of interference (pulse width $\tau$ divided by the pulse period T), the size of voice and other short packets such as TCP ACKs (acknowledges) versus data packets, and the maximum order of modulation permitted in clear zones.

Finally, in an embodiment, the system first detects and tracks all periodic impulse/burst noise which is present and continues to search for impulse/burst noise, and whenever detected impulse/burst noise does not fit into current tracked waveforms, the system classifies this noise as random and keeps track of all randomly detected events so that overall FEC, interleaving, packet size, and other signaling parameters under the control of the CMTS may be altered on a global scale to account for random noise events which cannot be tracked.

C. Ingress Detection System

Figure 13:
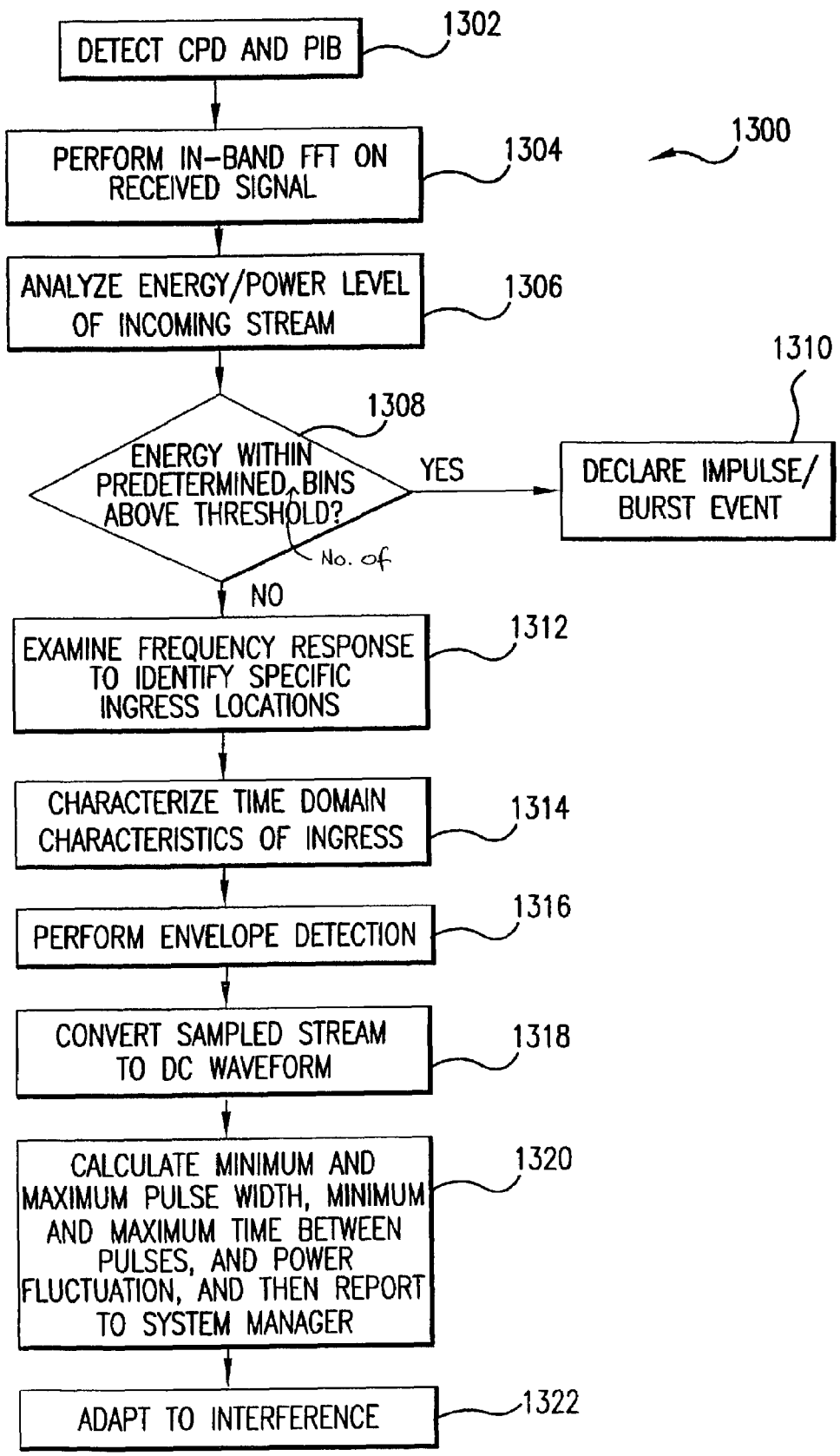
FIG. 13 is a flow diagram demonstrating the operation of a system for detecting ingress in accordance with embodiments of the present invention.

Referring to FIG. 13, the described exemplary detection system preferably detects and tracks ingress after CPD and periodic impulse/burst noise have been detected, as shown in step 1302. Advantageously, the detection of ingress after the detection of CPD and PIB reduces the likelihood that frequencies having CPD and/or time-slots having burst noise are improperly classified as having ingress. In operation, the described exemplary detection system performs an in-band FFT, as shown in step 1304 on the incoming stream, preferably during a period when the central controller is not receiving an upstream signal and when no periodic impulse/burst noise is expected. The described exemplary detection system analyzes the energy/power level of the incoming stream, as shown in step 1306.

Since periodic impulse/burst noise or random impulse/burst noise have wide spectral characteristics, if more than a predetermined number of bins are above a predetermined threshold, the described exemplary detection system classifies the bin as a random impulse/burst noise event, as shown in step 1310, and recaptures ingress in a different time interval. For additional robustness, the described exemplary detection system also correlates the received signal with the predicted in-band CPD tones to ensure that none of the detected ingress tones are due to CPD.

When an FFT capture is free of impulse/burst noise, the detection system tabulates frequency bins where ingress is detected (energy above a predetermined threshold) as shown at step 1312. Alternatives to such threshold detection are described in connection with FIGS. 24 and 25. The described exemplary detection system interfaces with the scheduler 218 and system manager 222 to schedule in-band time domain captures at a reduced sampling rate and increased record length to begin characterizing the time domain characteristics (on/off times) of the ingress, as shown in step 1314.

The described exemplary embodiment preferably begins with the ingress that has the highest energy level and/or the highest bandwidth. In an embodiment, the detection system utilizes contiguous frequency bins in the FFT at similar energy levels to locate the ingress with the highest energy level and/or the highest bandwidth. The detection system sums the total energy and total bandwidth in contiguous frequency bins above a predetermined threshold.

The described exemplary detection system performs envelope detection, as shown in step 1316, of the time domain captures to produce a baseband waveform of the ingress that provides power as a function of time, on/off intervals, etc. The detection system then converts the sampled stream into DC waveforms, as shown in step 1318, using, for example, envelope detection of power, or any one of a number of techniques known to those skilled in the art for converting an RF stream into a DC pulsed waveform.

The described exemplary detection system uses a conversion process that maintains the power versus time characteristic so that power fluctuations are observed. An exemplary detection system calculates the rising and falling edges from the DC pulse waveform and then calculates pulse widths as well as the time between pulses. In addition, an exemplary detection system calculates power fluctuations within pulses and between pulses. The described exemplary system further processes the pulse data to identify minimum and maximum pulse width, minimum and maximum time between pulses, and power fluctuation. An exemplary detection system repeats the process for each ingress frequency discovered in band. The detection system preferably reports the overall minimum and maximum pulse width, minimum and maximum time between pulses and power fluctuation to the system manager 222, as shown in step 1320, for adaptation and ICF update rate specification, as shown in step 1322.

IV. Dynamic Adaptation

A. Introduction

In CMTS 104, the use of advanced receiver processing and system adaptation substantially increases the data capacity of an upstream channel or channels by opening up new RF spectrum and more efficiently using existing RF spectrum. The upstream channel(s) is highly dynamic in the level and type of interference/impairment present. Accordingly, CMTS 104 dynamically senses and adapts to changing channel conditions caused by the dynamic impairment(s). Such dynamic adaptation ensures that the channel remains active, even in the presence of strong interference, and ensures that as the channel conditions improve, the channel capacity is restored to higher levels. Dynamic channel adaptation techniques can improve channel performance in the presence of all of the most common upstream plant impairments, such as AWGN, ingress, CPD and impulse/burst noise. Dynamic channel adaptation techniques can increase channel performance in the presence of dynamic impairments, that is, where the types and levels of impairments vary over time.

Typically, a channel operates in accordance with a set of operating parameters, also referred to as signaling parameters. Typically, the set of operating parameters includes/specifies a combination of a plurality of operating parameters. However, a set of operating parameters may also be considered to minimally specify only one operating parameter. Such operating parameters include, but are not limited to:

Modulation, including
  Type of modulation, such as QAM, Quadrature Phase Shift Keying (QPSK) modulation, and so on, and
  Order of modulation, such as 16 QAM or 64 QAM;
The presence or absence of FEC, and the type and level of FEC when it is present;
The presence or absence of data interleaving, and the level/length of data interleaving when it is present;
Symbol rate (SR);
Carrier frequency $f_c$;
Number of frequency sub-channels into which a channel is divided;
The presence or absence of ingress cancellation, and the level of ingress cancellation when it is present; and
The presence or absence of equalization, and level of equalization when it is present In an embodiment of the present invention, an upstream channel operates in accordance with a set of operating parameters. CMTS 104 monitors the upstream channel for the presence of channel impairments and characterizes the impairments. In response to the characterized impairments, CMTS 104 dynamically adjusts the set of operating parameters in order to maximize channel performance in the presence of the impairments. The performance of a channel may be quantified in accordance with many different channel performance metrics, such as spectral efficiency, represented as "channel data rate per frequency unit" (for example, bits/second/Hz), packet error rate (PER), or latency. Latency is a time delay through the channel.

B. Adaptation Techniques

1. Modulation and Error Correction

One dynamic adaptation technique includes adjusting (for example, increasing or decreasing) the level of FEC used in the channel, and/or adjusting the type of FEC used in the channel. For example, the level of FEC used on packet transmissions can be increased as impairments increase. Over 6 dB improvement in robustness is possible with this technique, albeit with a 20-30% drop in spectral efficiency. Another dynamic adaptation technique includes adjusting modulation (for example, changing the type of modulation, or increasing or decreasing the order of modulation). For example, 64 QAM can be reduced to 16 QAM for 6 dB of improvement in robustness, or all the way down to QPSK for 12 dB of improvement. Taken together, changing FEC and modulation can provide up to 18 dB of improvement in robustness at the expense of 75% of network capacity. As one study has shown, ingress noise varies across a channel spectrum by 15 dB to 20 dB. Thus, channel performance may be improved using the exemplary modulation choices described herein.

2. Channel Hopping

Another adaptation technique includes adjusting (increasing or decreasing) the channel center frequency to avoid significant levels of impairments such as ingress. This frequency hop adaptation technique may require only slight shifts in carrier frequency as opposed to hopping to an entire new block of spectrum on the upstream channel, although both options are viable.

3. Symbol Rate

The symbol rate may be adjusted (for example, increase or decreased). For example, the symbol rate can be reduced for increased robustness against all types of impairments, but at the cost of reduced capacity. Assuming the channel transmit power is maintained, a reduction in symbol rate by a factor of two adds 3 dB more robustness against AWGN, ingress, and burst noise. Further, the length of an impulse event that can be corrected is doubled by the fact that in the time domain, the symbols are twice as long as before, therefore fewer symbols are corrupted by the same impulse event.

4. Channel Dividing

In bandwidth limited situations, for example, when CMTS 104 can not assign more bandwidth for data transmissions, the CMTS may divide a given channel into sub-channels as an adaptation technique. If the channel is already divided, then the number of sub-channels may be adjusted. For example, if the symbol rate is reduced to mitigate impulse/burst noise, the channel capacity can be maintained by dividing the channel into smaller sub-channels with the same spectral power density. Typically, channel dividing in this manner requires concomitant changes in both the symbol rate and the center frequency. The change in channel frequency due to center frequency and/or symbol rate change usually requires the system to adjust relative offsets (for example, timing offset) between the transmitter and the receiver, in a process known as ranging. Channel equalization via transmitter pre-equalizer is also performed in the ranging process. When altering the center frequency of upstream channels, the following conditions apply:

1) Re-ranging is generally required; and
2) If the order of modulation is already reduced to QPSK, re-ranging will likely not be required as pre-equalization can be avoided.

A undivided channel initially able to support only QPSK due to narrowband and broadband impairments may be divided to advantageously support higher orders of modulation. Typically, channel dividing requires the availability of backup upstream receivers (for example, demodulators 206) to optimize the capacity of the network under impaired conditions.

5. Other Impairment Techniques

In the presence of detected channel impairments, such as moderate impulse noise, CMTS 104 can increase interleaving (that is, an interleaving length) while maintaining a present order of modulation (for example, 64 QAM), or reducing the order of modulation. Alternatively, interleaving may be decreased.

Another dynamic adaptation includes "smart scheduling" when periodic burst noise exists, if the noise can be detected and tracked in time. In this case, data packet transmissions can be scheduled around, that is, to avoid, the impairment without requiring a symbol rate reduction.

C. Adaptation System

CMTS 104 implements dynamic adaptation techniques. That is, CMTS 104 dynamically adapts channel operating parameters to changing channel impairments. IDC 220 acts as an upstream channel spectrum monitor that detects and classifies (that is, characterizes) RF impairments on the upstream channel(s). Typically, IDC 220 performs this process according to rules based on CMTS measurements and impairment models. For example, IDC 220 classifies each impairment separately, since different adaptation strategies exist for different impairments. For example, if the total interference power is used to characterize a channel, then ingress cancellation and FEC/interleaving will not be leveraged to their fullest extents.

Consider a channel having the following impairments: (1) an AWGN background noise floor that is 22 dB below a channel signal power level; and (2) an ingress signal that is 10 dB above the signal power level. Modems may successfully operate at 64 QAM or at 16 QAM with these impairments, even though the combined power of these two impairments tends to indicate the channel is unusable due to the combined SNR being too low for even QPSK operation. Thus, it is desirable to be able identify and measure (that is, characterize) the different impairments separately.

Further, for improved effectiveness of impairment mitigation, IDC 220 examines both in-band and out-of-band impairments. In the case of a single strong in-band ingress signal that is near a channel edge, a slight shift of center frequency only may be all that is required to keep the channel active and at peak capacity. If the symbol rate is to be reduced without the creation of additional sub-channels, a best frequency position for the signal with the reduced symbol rate must be determined. Finally, for impulse/burst noise adaptation, the IDS 220 should also have the capability to measure/characterize impairments in the time domain, as well as in the frequency domain, to enable smart scheduling of data bursts in time.

IDC 220 reports impairment detection and classification (that is, characterization) results to system manager 222. Typically, these results include a SNR for each impairment. As used herein, the terms "SNR" and "SIR" (signal-to-impairment ratio) are equivalent and interchangeable. Based on these results, and channel performance metrics, system manager 222 determines a set of operating parameters for the channel that optimizes system performance, such as channel capacity, while maintaining sufficient robustness against the reported impairments. In arrangements where the upstream channel carries data packets in data bursts, the set of operating parameters is referred to as a "burst profile."

In a lab environment, channel performance may be characterized against different types of impairments and respective impairment levels. This characterization includes determining an optimum set of channel operating parameters for each impairment and impairment level. The optimum set of operating parameters (for example, the optimum burst profile) is intended to achieve an intended level of channel performance corresponding to the impairment and impairment level. The resulting optimum sets of operating parameters may be stored in what is referred to as Adaptation Lookup Tables (see Tables 224 in CMTS 104) indexed by impairment type, impairment level and/or intended channel performance. The impairment level and the intended channel performance may each be specified as either a single level/value or as a range of levels/values.

Table 1 below is an example Adaptation Lookup Table (also referred to as a "lookup table") for AWGN impairments. The rows of Table 1 correspond to sets of operating parameters (the rows) with coarse operating parameter changes between each set of operating parameters. Other Adaptation Lookup Tables, similar in structure to Table 1, but having more burst profiles than Table 1, may include more finely tuned sets of operating parameters having relatively fine parameter changes between the sets of operating parameters.

TABLE 1

Adaptation Lookup Table for AWGN

| SNR (dB) | Modulation | FEC level |
|---|---|---|
| 35 | 256 QAM | Low |
| 30 | 256 QAM | Med |
| 25 | 64 QAM | Low |
| 20 | 64 QAM | High |
| 15 | 16 QAM | High |
| 10 | QPSK | Med |

In Table 1, as the level of FEC increases (that is, the FEC overhead is increased) and the modulation type decreases, the spectral efficiency drops, but for the benefit of greater robustness. The actual FEC used in each burst profile will depend on the data packet size, quality of service required, and so on. For example, a set of lookup tables could correspond to a PER of less than 1%, while another set of lookup tables could correspond to error rates of up to 5%. The former lookup tables could also correspond to voice packets and the latter to best effort data packets.

Thus, there may be several lookup tables for each type of service and packet size that optimizes the burst profile against a given level of AWGN, to achieve an intended PER.

Similar lookup tables can be developed for each impairment and combinations of impairments. In this manner, when any previously seen (or postulated) combination of impairments are detected on the upstream channel, CMTS 104 can access and apply the optimum burst profiles for those particular impairments. The system manager 222 may also derive a set of operating parameters from the lookup tables in response to an impairment scenario not found in the lookup tables.

D. Adaptation Data and Results

Channel performance has been characterized against AWGN and/or ingress to develop adaptation information (data/results) that can be used in the present invention, and which is now described in connection with the tables (which may be stored in a memory and used as Adaptation Lookup Tables) and graphs of FIGS. 14-20. Specifically, this adaptation information addresses the question of which QAM modulations and FEC techniques may be used under various conditions of AWGN in order to maximize channel spectral efficiency, subject to the constraint of robust operation. The information (data/results) presented in FIGS. 14-20 is based on both theoretical considerations and actual measurements.

1. QAM and FEC Adaptation Results

FIG. 14 is a table (Table 2) of Required SNR for Varying FEC in sixteen (16) QAM Modulation. It can be seen from Table 2 that when a channel is operated at a given QAM modulation level, the channel performance against AWGN and ingress will vary by up to 5 or 6 dB, depending on the amount of FEC overhead that is present. Table 2 shows such a performance variation for 16 QAM on large data packets.

Figure 15:
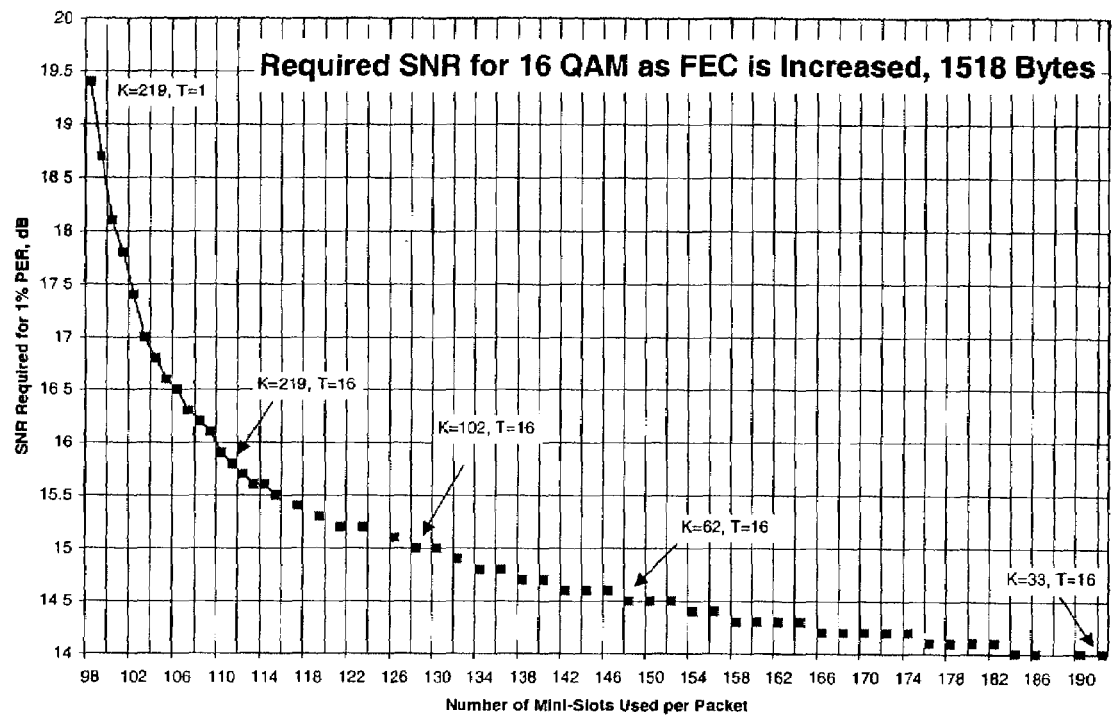
FIG. 15 is plot of the data in Table 2 (FIG. 14).

FIG. 15 is plot of the data in Table 2. Thus, FIG. 15 is a plot of Required SNR for 16 QAM Large Packets as FEC T is increased and FEC K is decreased. Following the plot of FIG. 15 from left-to-right, first the value of FEC T increases, then the value of FEC K decreases.

Figure 16:
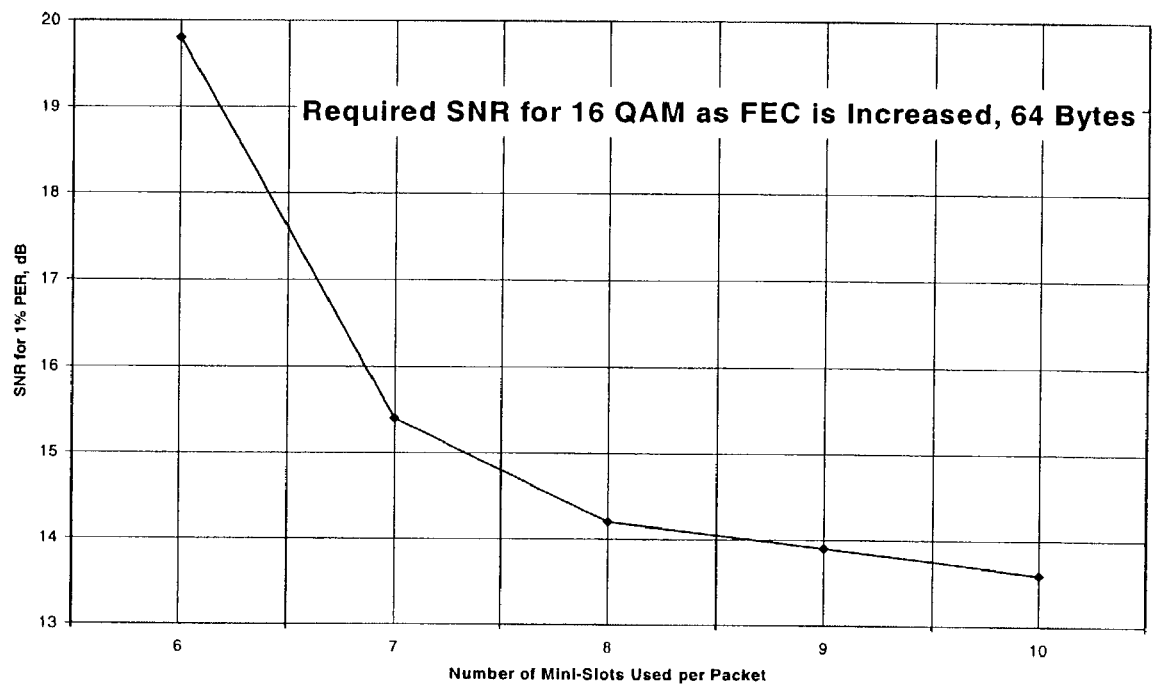
FIG. 16 is a plot of Required SNR for 16 QAM Small Packets as FEC T is increased and FEC K is decreased.

FIG. 16 is a is a plot of Required SNR for 16 QAM Small Packets as FEC T is increased and FEC K is decreased. That is, the plot of FIG. 16 shows the same variation as the plot of FIG. 15, except on small packets, where fewer options for FEC are available. The same overall behavior is seen in the plots of both FIGS. 15 and 16. Note: from Table 2, and as seen in the plots of FIGS. 15 and 16, a variation in required SNR of 5.5 dB results from varying the FEC parameters in 16 QAM.

2. AWGN Adaptation Results

FIG. 17 is a plot of Required SNR in AWGN versus Spectral Efficiency. The plot of FIG. 17 depicts the variation in required signal-to-noise level (or equivalently, the variation in signal-to-interference level in the case of ingress) as both QAM levels and FEC are varied against AWGN. The AWGN curves are based on simulation and comparison to spot measurements, where the measurements were used to adjust the simulation to match an actual implementation.

From the plot of FIG. 17, it is seen that the greatest reduction in required SNR occurs from increasing FEC T for a given QAM modulation. Reductions in FEC K provide some additional benefit. For the same spectral efficiency, a lower order of QAM with lower FEC T provides better robustness to achieve lower required SNR. That is, for the same spectral efficiency, a lower QAM with higher FEC K and lower FEC T is more robust than the next higher order QAM with lower FEC K and higher FEC T. The crossover points for each curve are roughly at the points where FEC T has been maximized, although for the lower orders of QAM the value of FEC K must be decreased even after FEC T has been maximized in order to transition to the next QAM curve.

A straight-forward adaptation rule for when to change QAM level results from examining the chart/plot of FIG. 17: the crossover points occur roughly every 3 dB, starting at about 27 dB SNR. Thus an adaptation algorithm for pure AWGN channels is to switch (that is, adapt) the modulation for every 3 dB decrease in channel SNR, as shown in a table (Table 3) of FIG. 18 that corresponds to the plot of FIG. 17. These values apply particularly to a relatively pure AWGN channel, and not to a channel having significant ingress and/or impulse noise combined with AWGN.

FIGS. 19A and 19B together represent a table (Table 4) that is a more detailed version of the relationships depicted in FIGS. 17 and 18. Table 4 includes specific FEC parameters.

3. Ingress Adaptation Results

Models and measurements of SNR (that is, SIR) vs. burst profile for various ingress cases, spanning single continuous-wave (CW) to multiple wideband ingressors, have been performed. FIG. 20 is a plot of AWGN and Ingress SNR (that is, SIR) requirements vs. Spectral Efficiency corresponding to these models and measurements. The plot of FIG. 20 is indicative of what to expect. It can be seen from the curves of FIG. 20 that as the number of ingressors and/or the bandwidth of ingressors increases, the curves approach those of the AWGN performance, as would be expected. Also, at the lowest spectral efficiencies, the difference in performance between one vs. multiple ingressors is less than a few dB, while for the highest spectral efficiencies, the difference between canceling one vs. multiple ingressors is on the order of 15 dB. In general, the cancellation curves of FIG. 20 tend to flatten out as the lowest SNRs (that is, SIRs) are reached. Finally, the shape of the curves changes as the bandwidth of the ingressors to be cancelled changes, with wideband ingressors taking on the general shape of the AWGN curves, while CW ingressor curves are more flat on the low spectral efficiency end and more exponential on the high spectral efficiency end.

From FIGS. 14-20, one exemplary adaptation rule that can be followed in the presence of AWGN is to decrease the order of modulation for every 3 dB SNR below 30 dB, starting with 256 QAM. The bottom range is at about 9 dB SNR for QPSK, but note that if BPSK were used, another 3 dB of SNR range could be obtained, extending the performance down to 6 dB SNR channels.

It is beneficial to characterize the interference power of ingressors in the channel separately from that of the AWGN in the channel, since an SNR (that is, SIR) of 10 dB could support either 64 QAM if the interference is ingress or only QPSK if the interference is AWGN. It is also beneficial to characterize the bandwidth and number of ingressors to determine which burst profile to use. For example, a measured ingress SNR (that is, SIR) of −3 dB could permit 256 QAM or 32 QAM, depending on whether the ingress was due to a single 20 kHz or four 20 kHz ingressors, respectively, with the difference in channel capacity for these profiles being a factor of two.

In the present invention, an adaptation causes a channel to operate at a reduced channel capacity during detected impairments but in a manner that keeps spectral efficiency as high as possible for the detected impairments (although at a diminished spectral efficiency relative to when the detected impairments is/are not present). Then, the adaptation causes the channel to return to a higher, or highest, spectral efficiency when the impairment diminishes or disappears.

E. Flow Charts

FIG. 21 is a flow chart of a method 2100 of dynamically adapting the operating parameters of a communication channel to channel impairments in the channel. Method 2100 may be performed in CMTS 104. Method 2100 maintains a desired level of channel performance over time. Channel performance may be represented as spectral efficiency (bits per second/Hz), PER, and/or latency (that is, delay through the communication system), or any other suitable performance metric (referred to herein as a quality metric).

In an embodiment, the communication channel carries data packets including data bits, and method 2100 maintains a minimum PER while maintaining a maximum spectral efficiency through adjustments of communication channel operating parameters based on channel impairment identification and classification, and through fine tuning (incremental adjustment) of the parameters based on PER. More generally, operating parameters of the channel may be adjusted to effect the goals mentioned above.

A first step 2104 includes operating the channel according to a set of operating parameters.

A next step 2106 includes detecting and identifying/classifying various channel impairments associated with the communication channel. A next step 2108 includes determining impairment characteristics for each impairment detected in step 2106. For example, a separate SNR is determined for each detected impairment. Together, steps 2106 and 2108 characterize the various channel impairments in a manner that avoids having one impairment corrupt the characterization (that is, detection and measurement) of another impairment. For example, processing of the various impairments may be performed in the order of: CPD impairments, then ingress, then impulse/burst noise, then additive white Gaussian noise, and so on. IDC 220 can perform steps 2106 and 2108.

As mentioned above, step 2108 includes determining SNRs for the various impairments. This includes determining a signal power for the communication channel. In an embodiment, this includes determining the signal power of a signal having a relatively constant power in the channel, when such a signal is available. For example, in DOCSIS, signal power may be determined based on the relatively constant power QPSK ranging signal when available in the channel.

Step 2108 may determine other impairment characteristics such as, but not limited to, a duration and a repetition rate of burst noise, a frequency location and a bandwidth of ingress, and so on.

Step 2108 determines an instantaneous or short-term SNR for CPD, an instantaneous SNR for ingress, an instantaneous SNR for burst noise, and an instantaneous SNR for AWGN, when these impairments are present in the channel. Also, step 2108 determines a running average, that is, a long-term average, of each of the above-mentioned SNRs. Also, for CPD, ingress and AWGN, step 2108 discards uncharacteristically low respective SNRs that may have been corrupted by impulse/burst noise.

Because an impairment, such as ingress, may appear, disappear, and then reappear soon after it disappeared, steps 2106 and 2108 also maintain a memory of certain impairments and their respective SNRs and other characteristics. For example, a memory of a recent maximum amplitude and frequency of an ingress event is maintained. This memory is used later.

A next step 2110 includes determining one or more quality metrics (QMs) or measures that are indicative of the performance of the communication channel with respect to the signal carried by the channel. Quality metrics may include packet error rate (PER), latency (that is, communication system delay), or spectral efficiency, or a combination thereof, for example. In one arrangement of method 2100, step 2110 is performed concurrently with channel impairment characterizing steps 2106 and 2108. Alternatively, steps 2106, 2108 and 2110 may be performed sequentially, and in any order. IDC 220 may include a quality metric generator (not specifically shown in FIG. 2) for determining the one or more quality metrics of step 2110. In an alternative arrangement, system manager 222 includes a quality metric generator (also not specifically shown in FIG. 2) for determining the one or more quality metrics of step 2110. Thus system manager 222 or IDC 220 may perform step 2110.

A next step 2111 includes determining whether the one or more QMs measured in step 2110 are within one or more respective predetermined ranges (also referred to as target ranges) of the QMs. For example, the predetermined ranges may include a predetermined range of PER, a predetermined range of latency, a predetermined range of spectral efficiency, or a combination thereof. These predetermined ranges may be stored in Adaptation Lookup Tables, as described above. System manager 222 may perform step 2111. A target range may be a single value at which the QM is to be maintained. Alternatively, a target range may be all values of the QM above or below a threshold value. Alternatively, a target range may be values between a minimum and maximum value of the QM. Other representations of QM target ranges are possible.

If the one or more QMs are within their respective predetermined ranges, then process flow returns to step 2104.

If the one or more QMs are not within their respective predetermined ranges, then a next step 2112 includes adjusting (for example, increasing or decreasing, or otherwise changing the values of) one or more operating parameters in the set of operating parameters of step 2104 based on at least one of (a) the one or more QMs determined in step 2110, and (b) at least one of the impairment characteristics (for example, impairment SNRs) determined using impairment characterizing steps 2106 and 2108. System manager 222 may perform step 2112.

Step 2112 may also include adjusting or invoking impairment cancellation techniques, adjusting equalization and interleaving. For example, step 2112 may include invoking a CPD cancellation technique if CPD is detected at a sufficiently high CPD SNR.

Also, step 2112 adjusts the operating parameters while taking into account the memory of impairments maintained in steps 2106/2108. Thus, if an impairment disappears during a time interval, step 2112 may still adjust parameters based on the "remembered" amplitude and frequency of the impairment.

Steps 2104-2112 repeat using the adjusted parameters to maintain the one or more QMs within the corresponding one or more target ranges. For example, this may include maintaining a desired spectral efficiency or PER for the communication channel.

The following example serves to illustrate method 2100. Assume the following conditions:

steps 2106/2108 determine ingress components spaced 4 MHz from each other;

the communication channel carries a communication signal having a bandwidth greater than 4 MHz; and step 2111 determines the PER associated with signal is not within the PER target range.

Then to avoid the ingress, and thus bring the PER to within the desired range, step 2112 reduces the symbol rate (and thus the bandwidth) of the signal and possibly adjusts the center frequency Fc of the signal.

FIG. 22 is a flow chart of an example method 2200 used to establish/set initial operating parameters for a channel. For example, method 2200 may be performed to establish an initial set of operating parameters used in a first pass through step 2104 of method 2100. In method 2200, a first step 2202 includes determining an AWGN level for the channel. A next step 2204 includes selecting an initial set of operating parameters based on the AWGN level determined in step 2202. The set of operating parameters may be selected from an Adaptation Lookup Table, described above.

An alternative method of establishing the initial set of operating parameters includes accessing default operating parameters stored in a system memory. The default parameters may be stored in memory at CMTS 104, or in individual remote modems 106. The default operating parameters are used as the initial operating parameters in step 2104, for example.

FIG. 23 is a flow chart of an example method expanding on operating parameter adjusting step 2112 of method 2100. Step 2112 includes a further step 2302 of selecting a new set of operating parameters from a lookup table indexed by at least one of (a) the one or more QMs of step 2110, and (b) the one or more impairment characteristics determined in step 2108. One or more of the operating parameters in the new set of operating parameters have adjusted values relative to the operating parameters used in previous step 2104.

Step 2112 includes another step 2304 of replacing the set of operating parameters used in previous step 2104 with the new operating parameters selected in step 2302. Thus, method 2100 uses the new, adjusted operating parameters selected in step 2302 in a next iteration through step 2104.

FIG. 24 is a flow chart of another example method 2400 of identifying CPD and/or ingress (that is, of identifying CPD/ingress). Method 2400 may be performed on an FFT spectrum including a series of frequency bins versus magnitude, produced by FFT processor 208.

An initial step 2402 includes determining a noise floor power density (for example, noise power per Hz) of the channel, in the frequency domain. A next step 2404 includes determining the presence of (that is, detecting) a frequency domain peak indicative of CPD/ingress. This includes detecting a positive slope (an amplitude that rises over frequency) followed by a negative slope (an amplitude that falls over frequency) in the frequency domain. Alternatively, this includes detecting magnitude differences between adjacent frequency bins that are greater than a predetermined amount. Typically, CPD/ingress has a bandwidth covering several frequency bins of the FFT spectrum.

Assuming a peak is detected, then a next step 2406 includes determining whether a power density corresponding to (that is, in the vicinity or frequency range of) the detected peak is greater than the noise floor power density.

A next step 2408 includes declaring that CPD/ingress is detected if the power density corresponding to the detected peak is greater than the noise floor power density by a predetermined amount. Typically, CPD/ingress may have a bandwidth covering several frequency bins of a spectrum produced using an FFT. An advantage of method 2400 is that CPD/ingress can be detected without comparing CPD/ingress amplitudes to an absolute threshold value.

FIG. 25 is a flow chart of another example method 2500 of identifying impulse/burst noise. Method 2500 identifies impulse/burst noise as a time domain signal waveform having a positive slope (rising with time) followed by a negative slope (falling with time) and as having a power per sample over that of the noise floor by a specified amount.

A first step 2502 includes determining a power of a noise floor of the communication channel.

A next step 2504 includes detecting a time domain peak indicative of the impairment using time domain samples of the channel. The time domain peak includes one or more time domain samples. For example, this step may include detecting, in the time domain, both a rising-edge and a falling-edge of the time domain peak, such that the time domain peak includes one or more time samples between the rising- and falling-edges.

A next step 2506 includes determining if each of the time domain samples of the time domain peak has a respective power (that is, power-per-sample) that exceeds the power of the noise floor by a predetermined amount.

A next step 2508 includes declaring that the impairment is detected when each time domain peak sample power exceeds the power of the noise floor by the predetermined amount.

Methods 2100 through 2500 may be implemented in system 100, and may incorporate some or all of the various features of methods 300, 900, 1000, 1200 and 1300, described above.

V. Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of dynamically adapting a communication channel to channel impairments, comprising:
   (a) operating the communication channel in accordance with an initial set of operating parameters;
   (b) determining a channel impairment characteristic related to a detected channel impairment present in the communication channel;
   (c) determining a quality metric indicative of channel performance for the communication channel;
   (d) when the quality metric is not within a target range, selecting a second set of operating parameters from a lookup table indexed by the quality metric and the impairment characteristic; and
   (e) replacing the initial set of operating parameters with the second set of operating parameters.

2. The method claim 1, wherein step (d) further comprises selecting the second set of operating parameters so as to bring the quality metric within the target range.

3. The method claim 1, further comprising:
   (f) repeating steps (a) through (e) so as to maintain the quality metric within the target range.

4. The method claim 1, further comprising, prior to step (a):
   determining an initial average noise level of the channel; and
   establishing the initial set of operating parameters used in step (a) based on the initial average noise level.

5. The method claim 1, wherein:
   the initial set of operating parameters includes at least two different operating parameters; and
   step (d) includes selecting one or more of the at least two different operating parameters.

6. The method claim 1, wherein the initial set of operating parameters includes at least two of
   channel modulation,
   level of forward error correction, and
   symbol rate.

7. The method of claim 6, wherein step (d) comprises selecting one or more of
   the channel modulation,
   the level of forward error correction, and
   the symbol rate.

8. The method of claim 6, wherein the set of operating parameters further includes a data interleaving length, a burst schedule, and a number of sub-channels into which the channel is divided.

9. The method of claim 1, wherein the detected channel impairment includes at least one of "average white Gaussian noise (AWGN)", common path distortion (CPD), Impulse/burst noise and ingress, and step (b) comprises determining, as the channel impairment characteristic, a channel signal-to-noise ratio (SNR) corresponding to the at least one of the impairments.

10. The method of claim 9, wherein said step of determining the channel SNR includes determining a signal power of a constant power signal in the communication channel.

11. The method of claim 9, wherein said step of determining the channel SNR includes determining the channel SNR as a running average of instantaneous SNRs.

12. The method of claim 11, wherein said step of determining the channel SNR includes discarding uncharacteristically low instantaneous SNRs when determining the running average.

13. The method claim 1, wherein step (c) comprises determining, as the quality performance metric, one of a packet error rate (PER), a channel spectral efficiency, and a channel latency.

14. The method claim 1, further comprising selecting the second set of operating parameters based on the detected channel impairment characteristic.

15. A system for dynamically adapting a communication channel to channel impairments, the communication channel being configured to operate in accordance with an initial set of operating parameters, comprising:

a spectrum monitor configured to
determine a channel impairment characteristic related to a detected channel impairment present in the communication channel; and a system manager configured to
determine a quality metric indicative of channel performance for the communication channel;
select a second set of operating parameters from a lookup table indexed by the quality metric and the impairment characteristic when the quality metric is not within a target range; and
replace the initial set of operating parameters with the second set of operating parameters whereby the communication channel operates in accordance with the adjusted parameters.

16. The system of claim 15, wherein the system manager is configured to select the second set of operating parameters so as to bring the quality metric within the target range.

17. The system of claim 15, wherein the system manager is configured to select the second set of operating parameters based on the channel impairment characteristic from the spectrum monitor.

18. The system of claim 15, wherein the spectrum monitor is configured to:
determine an initial average noise level of the channel; and
establish the set of initial operating parameters based on the initial average noise level.

19. The system of claim 15, wherein:
the initial set of operating parameters includes at least two different operating parameters; and
the system manager is configured to adjust one or more of the at least two different operating parameters.

20. The system of claim 15, wherein the initial set of operating parameters includes at least two of
channel modulation,
level of forward error correction, and
symbol rate.

21. The system of claim 20, wherein the system manager is configured to adjust one or more of
the channel modulation,
the level of forward error correction, and
the symbol rate.

22. The system of claim 20, wherein the set of operating parameters further includes a data interleaving length, a burst schedule, and a number of sub-channels into which the channel is divided.

23. The system of claim 15, wherein the detected channel impairment includes at least one of "average white Gaussian noise (AWGN)", common path distortion, Impulse/burst noise and ingress, and the spectrum monitor is configured to determine, as the channel impairment characteristic, a channel signal-to-noise ratio (SNR) corresponding to the at least one of the impairments.

24. The system of claim 15, wherein the system manager is configured to determine, as the channel performance metric, one of a packet error rate (PER), a channel spectral efficiency, and a channel latency.

25. The system of claim 15, wherein the system further comprises:
a memory for storing the lookup table, the lookup table being an Adaptation Lookup Table that includes a plurality of predetermined sets of operating parameters.

26. A system for dynamically adapting a communication channel to channel impairments, the communication channel being configured to operate in accordance with a first set of operating parameters, comprising:
a memory for storing predetermined sets of operating parameters for the channel in one or more lookup tables;
a spectrum monitor configured to
determine a channel impairment characteristic related to a detected channel impairment present in the communication channel; and
a system manager configured to
determine a quality metric indicative of channel performance for the communication channel, and
determine whether the quality metric is within a target range, and if the quality metric is not within the target range, then
select, from among the predetermined sets of operating parameters, a second set of operating parameters based on the channel impairment characteristic and the quality metric,
wherein each set of operating parameters is indexed by a respective quality metric value and a respective channel impairment characteristic value.

27. The system of claim 26, wherein the system manager is configured to select the second set of operating parameters so as to bring the quality metric within the target range.

* * * * *